United States Patent
Simantov et al.

(10) Patent No.: US 10,936,863 B2
(45) Date of Patent: Mar. 2, 2021

(54) SYSTEMS AND METHODS FOR NEURONAL VISUAL-LINGUISTIC DATA RETRIEVAL FROM AN IMAGED DOCUMENT

(71) Applicant: WAY2VAT LTD., Tel-Aviv (IL)

(72) Inventors: Amos Simantov, Hod Hasharon (IL); Roy Shilkrot, Kibbutz Negba (IL); Nimrod Morag, Hod Hasharon (IL); Rinon Gal, Tel-Aviv (IL)

(73) Assignee: WAY2VAT LTD., Tel-Aviv (IL)

( * ) Notice: Subject to any disclaimer, the term of this patent is extended or adjusted under 35 U.S.C. 154(b) by 0 days.

(21) Appl. No.: 16/500,102

(22) PCT Filed: Nov. 13, 2018

(86) PCT No.: PCT/IB2018/058891
§ 371 (c)(1),
(2) Date: Oct. 2, 2019

(87) PCT Pub. No.: WO2019/092672
PCT Pub. Date: May 16, 2019

(65) Prior Publication Data
US 2020/0110930 A1    Apr. 9, 2020

Related U.S. Application Data

(60) Provisional application No. 62/642,686, filed on Mar. 14, 2018, provisional application No. 62/585,116, filed on Nov. 13, 2017.

(51) Int. Cl.
*G06K 9/62* (2006.01)
*G06K 9/00* (2006.01)
*G06N 20/00* (2019.01)
*G06N 3/08* (2006.01)
*G06Q 30/04* (2012.01)

(52) U.S. Cl.
CPC .......... *G06K 9/00449* (2013.01); *G06N 3/08* (2013.01); *G06N 20/00* (2019.01); *G06Q 30/04* (2013.01)

(58) Field of Classification Search
CPC .. G06F 16/532; G06K 9/00449; G06N 20/00; G06N 3/08; G06Q 30/04
See application file for complete search history.

(56) References Cited

U.S. PATENT DOCUMENTS

| | | | |
|---|---|---|---|
| 10,255,550 B1* | 4/2019 | Simkoff | G06N 7/005 |
| 2013/0330008 A1* | 12/2013 | Zadeh | G06K 9/6267 |
| | | | 382/195 |
| 2014/0046876 A1* | 2/2014 | Zhang | G06F 16/3329 |
| | | | 706/11 |
| 2017/0270100 A1* | 9/2017 | Audhkhasi | G06F 40/289 |
| 2017/0308792 A1* | 10/2017 | Liang | G06N 5/02 |

FOREIGN PATENT DOCUMENTS

WO     2017060850 A1    4/2017

* cited by examiner

*Primary Examiner* — Xin Jia
(74) *Attorney, Agent, or Firm* — Alphapatent Associates, Ltd; Daniel J. Swirsky

(57) ABSTRACT

Systems and methods for automatic information retrieval from imaged documents. Deep network architectures retrieve information from imaged documents using a neuronal visual-linguistic mechanism including a geometrically trained neuronal network. An expense management platform uses the neuronal visual-linguistic mechanism to determine geometric-semantic information of the imaged document.

2 Claims, 16 Drawing Sheets

SYSTEMS AND METHODS FOR NEURONAL VISUAL-LINGUISTIC DATA RETRIEVAL FROM AN IMAGED DOCUMENT

CROSS-REFERENCE TO RELATED APPLICATIONS

This application is a U.S. National Phase Application under 35 U.S.C. 371 of International Application No. of PCT/IB2018/058891, which has an international filing date of Nov. 13, 2018, and which claims priority and benefit from U.S. Provisional Patent Application No. 62/585,116, filed Nov. 13, 2017, and U.S. Provisional Patent Application No. 62/642,686, filed Mar. 14, 2018, the contents of which are incorporated by reference in their entirety.

FIELD OF THE DISCLOSURE

The disclosure herein relates to systems and methods for automatic information retrieval from imaged documents. In particular, but not exclusively, the disclosure relates to the use of deep network architectures to retrieve information from invoice images.

BACKGROUND

Receipts are crucial for many businesses' operation, where expenses are tracked meticulously. Specifically, tracking business expenses using scanned receipt images is a widespread practice in the organizational finance world and receipt documents are often scanned into images, digitized and analyzed before the information is streamed into institutional financial applications. The precise extraction of expense data from receipt images is a difficult task owed to the high variance in fonts and layouts, the frailty of the print paper, unstructured scanning environments and an immeasurable number of domains.

Thus, the need remains for effective and efficient information retrieval from receipt images. The invention described herein addresses the above-described needs.

SUMMARY OF THE EMBODIMENTS

According to one aspect of the presently disclosed subject matter, a method is hereby taught for use in an expense management platform. The method is operable to perform content analysis of an imaged document comprising at least one invoice, in an improved manner, the expense management platform comprising: an automatic invoice analyzer (AIA) comprising a dedicated invoice optical character recognition (OCR) engine, the automatic invoice analyzer (AIA) operable to perform automated analysis of the at least one invoice; a machine learning engine comprising a knowledge repository; and a neuronal visual-linguistic mechanism trained to perform visual-linguistic semantic analysis, wherein the neuronal visual-linguistic mechanism comprises a geometrically trained neuronal network, the method comprising the steps of: receiving, via a communication interface, the imaged invoice document; pre-processing, by the automatic invoice analyzer (AIA), the at least one invoice; extracting, by the dedicated invoice optical character recognition (OCR) engine, a set of OCR results associated with the at least one invoice; generating, by the automatic invoice analyzer (AIA), an OCR-enhanced image of the at least one invoice; applying, by the automatic invoice analyzer (AIA), linguistic semantic analysis geometrically to determine a semantic information of at least one element of the at least one invoice; and producing, by the automatic invoice analyzer (AIA), one or more analysis results using the neuronal visual-linguistic mechanism.

The method of performing invoice content analysis, wherein the step of applying further comprising: creating a character-level embedded image overlaid with the set of OCR results; and using said embedded image to jointly learn at least one spatial feature and one linguistic feature.

Further, the method of performing invoice content analysis, wherein the step of applying comprising: combining at least one visual feature and at least one linguistic feature to enable automatic information retrieval from said at least one invoice. Accordingly, wherein the step of combining further comprises: accessing one or more deep network architectures.

Additionally, the method of performing invoice content analysis, wherein the step of applying comprises: using a Skip-Gram method to loop on words of a sentence and predict associated neighbors.

Optionally, the method of performing invoice content analysis, wherein the step of applying further comprises: combining format parameters and geometric parameters; and retrieving improved semantic information of a language and of at least one spatial domain of the at least one invoice.

Optionally, the method of performing invoice content analysis, wherein the step of applying further comprises: identifying a relationship between a textual format and a spatial proximity in the OCR-enhanced image. Accordingly, wherein the step of identifying a relationship comprises: pairing one or more proxemic words in the at least one invoice; applying a deep convolutional model to encode geometric parameters and semantic parameters consistently; and combining a morphologic character-level formative structure with at least one geometric parameter.

Optionally, the method of performing invoice content analysis, wherein the step of applying further comprises: applying a character-level embedding model to one or more words in the at least one invoice.

Optionally, the method of performing invoice content analysis, wherein the step of applying further comprises: analyzing quality of said at least one invoice; and generating at least one quality index for the at least one invoice.

As appropriate, the method of performing invoice content analysis, wherein the step of pre-processing further comprises: analyzing quality of said set of OCR results; and generating at least one quality index of the set of OCR results.

As appropriate, the method of performing invoice content analysis, wherein the step of producing further comprises: generating at least one business report comprising at least one analysis result; and communicating, by the communication interface, the at least one business report.

As appropriate, the method of performing invoice content analysis, further performing at least one learning operation selected from a group consisting of: online machine learning, batch learning and combinations thereof.

As appropriate, the method of performing invoice content analysis, wherein the step of pre-processing further comprises at least one step selected from a group consisting of: performing "4 point" segmentation; performing full segmentation; performing initial quality assessment; performing deskewing, reorientation and dewarping; performing lighting and adaptive thresholding; performing text area detection; performing text enhancement; performing denoising; and performing quality scoring.

As appropriate, the method of performing invoice content analysis, wherein the step of post-processing further comprises at least one step selected from a group consisting of: performing OCR enhancement context; performing feature extraction; performing OCR enhancement context; performing classifications; performing a language processing; performing tagging and labeling; and performing quality scoring.

Additionally, the method of performing invoice content analysis, wherein the step of pre-processing comprises at least one step selected from a group consisting of: converting structured handwritten text into at least one machine readable string in the at least one invoice; identifying a company logo associated with the at least one invoice; analyzing the at least one invoice with content of at least one language; analyzing said at least one invoice at an orientation; and removing distortions from said imaged invoice document.

Optionally, the method of performing invoice content analysis, wherein the step of applying further comprises: creating an embedding model operable to generate an encoding vector to find an embedding that encodes a pair relationship of a word and a target neighbor; training a network using the encoding vector; and creating a working dataset based an initial dataset and further performing augmentation using synthetic image transformations and simulated noise to receive said working dataset.

Optionally, the method of performing invoice content analysis, wherein the step of applying further comprises: performing layout analysis using convolutional approaches to determine relationship between text and location.

In another aspect of the disclosure, an expense management platform is disclosed, operable to perform automatic data retrieval from an imaged invoice document, said expense management platform comprising: an automatic invoice analyzer (AIA) operable to perform automated analysis of the imaged invoice document; a machine learning engine comprising a knowledge repository, said machine learning engine operable to update the knowledge repository with data pertaining to said invoice imaged document; and a neuronal visual-linguistic mechanism trained to perform visual-linguistic semantic analysis; wherein the neuronal visual-linguistic mechanism comprises a geometrically trained neuronal network, such that the expense management platform is operable to produce one or more analysis results using said neuronal visual-linguistic mechanism to determine geometric-semantic information.

As appropriate, the expense management platform, wherein the automatic invoice analyzer (AIA) comprises a dedicated invoice optical character recognition (OCR) engine operable to generate an OCR-enhanced image.

As appropriate, the expense management platform, wherein the neuronal visual-linguistic mechanism comprises a memory storage device containing data characterized by geometric parameters, and the neuronal visual-linguistic mechanism may include one or more deep network architectures to combine at least one visual feature and at least one linguistic feature to enable automatic information retrieval from the imaged invoice document.

Additionally, the expense management platform, wherein the automatic invoice analyzer comprises a content recognition mechanism operable to read and interpret said imaged invoice document and the content recognition mechanism comprises: a pre-processing module operable to read the invoice imaged document and perform a series of implied transformation procedures using computer vision algorithms to enable image processing; and an image post-processing module operable to perform image related context analysis comprising field classification and textual analysis.

As appropriate, the expense management platform, wherein the image post-processing module is operable to use at least one recurrent neural network (RNN).

As appropriate, the expense management platform, wherein the machine learning engine comprises a deep-learning data-processing module, and further comprises a joint-learning model combining format parameters and geometric parameters.

Further, the expense management platform, wherein the visual-linguistic mechanism comprises a full tagging sub-system operable to provide word matching. Accordingly, the full tagging sub-system, comprises: a Char2Vec network operable to generate at least one word-level embedding from an associated character level content and an associated geometric context; a labeling network operable to generate a heat-map of at least one label probability using a base image overlaid with data of the at least one word-level embedding; and an inverted-softmax linear classifier configured to determine a best candidate word to match the at least one label probability using said heat-map and a set of hand-crafted features.

Additionally, the expense management platform, wherein the automatic invoice analyzer (AIA) comprises a memory storing device containing a plurality of said imaged invoice document and data characterized by at least one characteristic selected from a group consisting of: a textual field, a location, a language, a format, a geometry, a category and combinations thereof. Accordingly, the expense management platform, wherein the memory storing device comprises a plurality of imaged invoice document received from a digital source selected from a group consisting of: an image capturing device, a photographic device, an office scanner, a mobile device camera, a messaging application and combinations thereof.

As appropriate, the expense management platform, wherein the neuronal visual-linguistic mechanism comprises a user interface module operable to communicate data characterized by visualization elements.

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the various selected embodiments may be put into practice. In the accompanying drawings:

FIGS. 11A and 11B represent images the automatic field tagging process results, according to embodiments of the current disclosure.

DETAILED DESCRIPTION

Figure 1:
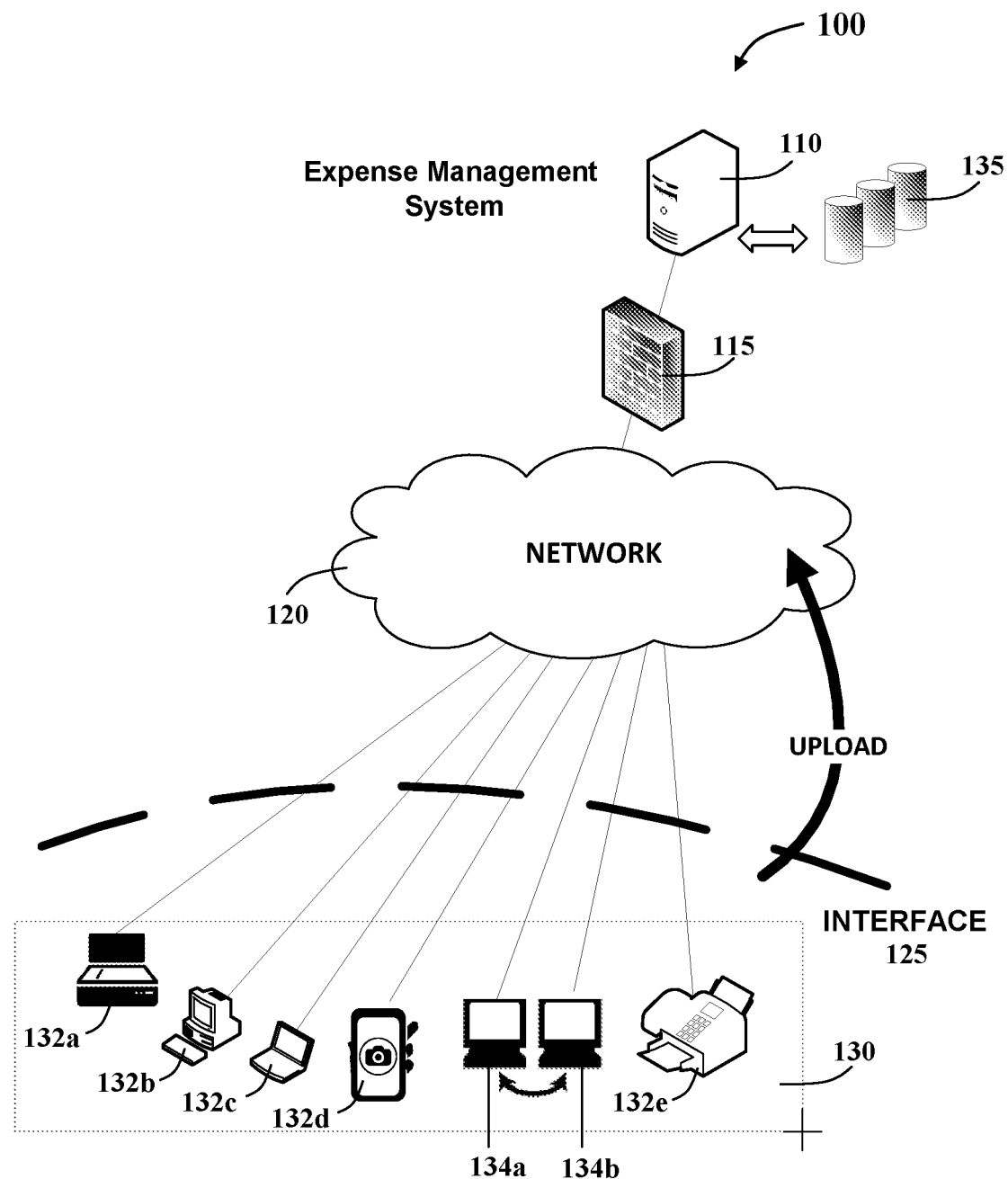
FIG. 1 is a schematic block diagram illustrating the main elements of a digital invoice upload mechanism from a system user to the automated expense management system, according to one embodiment of the current disclosure.

Aspects of the present disclosure relate to system and methods for providing automatic expense management and automatic information retrieval from invoice images using deep network architectures to answer business needs of an organization. The system comprises an automatic invoice analyzer (AIA), a machine learning engine comprising a knowledge repository and a neuronal visual-linguistic mechanism trained to perform visual-linguistic semantic analysis wherein the neuronal visual-linguistic mechanism comprises a geometrically trained neuronal network. The system is operable to produce one or more analysis results using the neuronal visual-linguistic mechanism and determine geometric-semantic information.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally, or alternatively, the data processor may access a non-volatile storage, for example, a magnetic hard-disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

The expense management system is configured as a machine aided management system for business documents (such as invoices/receipts) content analysis to enable VAT reclaim requests, travel expense management, Import/Export management may benefit the corporate finance department as well as for a business traveler visiting various countries on a business tour. Additionally, the system provides the business traveler with the ability to manage and control associated business expenses and direct communication with the organizational financial department.

The current disclosure refers to an automated system operable in an ever-improving manner, based upon an invoice content analyzer and a machine learning mechanism capable of handling large quantities of invoice images, which continuously update the system's knowledge repository thus improving its efficiency. The system may generate reports and forms automatically, such as expense reports according to a set of scanned invoice images of the business traveler.

For illustrative purposes only, various embodiments of the system are outlined below, comprising an invoice content analyzer mechanism to enable invoice image processing to determine the associated context and the relevant text.

The processing may include analysis of the various invoice image fields, determining the associated field text context at various levels, such as: (a) Extracting amount payable, type of currency such as US Dollar, Euro, Pound Sterling (GBP), Japan Yen (JPY) and the like; (b) Extracting the invoice identification number; (c) Extracting date, in various standard formats; and (d) Extracting business entity name, business identification number (in Israel), Employer Identification Number (EIN), also known as a Federal Business Tax Identification Number (in the U.S), a VAT number and business identity code in Europe and the like.

Where appropriate, the analysis may determine the type of the expense using associated context. For example, determining that the logo in the invoice header is associated with AVIS or any text in the invoice mentions the words "mileage" or "driver", may indicate that the context of the processed image may be associated with "travel expenses/ car rental". Additionally, implied expenses type such as transportation, car rental and the like may be automatically identified, even when not specifically stated in the invoice. The implied expense type may be based on expense types that are uniquely associated with the service provider. For example, the logo of AVIS may indicate that the implied expense type may be associated with "travel expenses/car rental".

The system is operable to allow the traveler to scan travel invoices using a mobile device camera, for example, and receive comprehensive travel reports at the end of the business trip. Technically, the expense management system may be operable, for example, to receive digital invoices online, perform implied analysis using machine learning and invoice classification, extract specific expense data and to generate expense report and expense management functionality for the business traveler and the corporate finance department. Additionally, or alternatively, the system may be operable to provide immediate feedback as to the quality of the received image and associated data, and allow for manual error correction.

The automatic expense management system is operable to determine key invoice information extracted from a digital invoice such as purchase order number, service provider identification number, invoice date, service provider name, invoice number, VAT number, VAT value, amount payable and the like. The system may do so from a document comprising a single or multi-page digital invoice, from different service providers spread across countries and written in multiple languages.

It is noted that the system may employ an automated image cleanup, a character recognition technology with built-in recognition logic to capture invoice data with high accuracy and is further configured to dynamically locate data of an invoice.

The Expense Management System may provide the corporate finance department with various financing tools to allow more transparent reporting and better control over business matters such as organizational travel expenses, if possible. More importantly, the system may help companies reclaim all potential VAT expenses smoothly and automatically. The system easily processes foreign and local VAT reclaims once expenses are recorded and classified. Additionally, the system software may be readily integrated into all back-office systems, saving organizational resources.

Accordingly, a user interface may be provided by which a user may request automated processing of a foreign tax return claim. Where appropriate, systems may incorporate a one-click tax reclaim system. Once a user has uploaded financial data, as images, as rendered pdf documents or the like, such a system may allow the user to click on a single button and the system may automatically generate tax reclaim forms using pertinent financial data and may further submit the forms automatically thereby streamlining the tax reclaim process.

Furthermore, the system may provide the business traveler easy functionality to manage expenses and VAT/Tax reclaims. Thus, a business traveler may capture images of invoice/receipts during a business travel using a mobile device, and using an application (operable to use advanced character recognition and GPS technology) may interpret the contents of the captured invoice images and store the information on the cloud, via the application. Upon returning, the business traveler may generate a detailed travel expense report instantly, claim reimbursement immediately for incurred expenses. Additional features may enable users to create travel itineraries, deal with organizational travel approval process, book or change flights and hotels, and the like.

As described hereinafter in this document, the technology required for the automated content analysis of digital invoices, and further associated with construction-related automated analysis for tax reclaim reports is based on scanning of the digital invoices. Thus, the expense management system is capable of recognizing invoice line items or tabular data from the captured invoice images (scanning, photographing) retrieved from a single or a multi-page invoice document. Further, with the extracted line-item information, incoming invoices may automatically be matched with the correct service provider (for example, by identifying its logo) and purchase contract to ensure a more efficient purchase payment with associated VAT amount. The system may further be operable to generate a set of visual indications or highlights on the associated invoice document. Where appropriate, the system may indicate extracted data with precision rate, such that a human controller or an operator may concentrate immediately on important tasks, as needed. Additionally, or alternatively, the system may be operable to receive supportive data and visual indications on top of the invoice document such that human discovered resolutions may feed automatically the recognition and machine learning engines. For example, "this is the total field (and xxx is its amount). It is cross referenced with that field. Both located at this area of the page."

Where appropriate, the system is capable to automatically identify invoices coming from different service providers. This may be performed using the machine learning mechanism of the system, associated with a knowledge repository. The knowledge repository may include various data fields, pertaining data associated with a service provider including service provider name, service provider ID, registration number, VAT number, location and addresses and the like.

Where appropriate, the system is operable to extract information from other internal and external sources, to improve its efficiency and gain high recognition rate of invoices and to enable processing large invoice volumes.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally, or alternatively, the data processor may access a non-volatile storage, for example, a magnetic hard-disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

DESCRIPTION OF THE EMBODIMENTS

Reference is now made to FIG. 1, there is provided a general schematic block diagram representing an upload mechanism, which is generally indicated at 100, for uploading digital invoices, by a system user (business traveler, for example) onto the data repository of the automated expense management system, according to one embodiment of the current disclosure. The upload mechanism 100 consists of an electrical device 130 operable to create a digital expense document/capturing an invoice image may further use an application interface 125 enabling communication with an expense management system 110 via a communication network 120 such as the internet. The expense management system is operable to receive the transmitted digital media (a digital document/captured invoice image and the like), perform initial quality assessment analysis, provide immediate feedback (as described in FIG. 2, hereinafter) and store the digital document and associated data in a data repository 135.

The system business user may use an electrical device 130 comprising various digital cameras or more commonly use the camera of his/her communication device such as smartphone, tablet and the like. Specifically, the electrical device may be selected from a group consisting of an office scanner 132*a*, a digital machine such as a personal computer 132*b* or a laptop computer 132*c*, a smartphone 132*d* (or a tablet) and a facsimile machine 132*e*. Additionally, invoices may undergo digital processing between two computers 134*a* and 134*b*, such as an airline ticket office sending an invoice to one's computer. The upload interface 125 may be a software application, a dedicated web site and the like.

It is noted that the various electrical devices 130 may be operable to communicate a digital document such as messages, e-mails and the like comprising data pertaining to an invoice.

It is further noted that captured invoice images may be compressed to allow for better communication and ease of uploading.

Optionally, the computing server hosting the expense management system is protected by a firewall 115.

Figure 2:
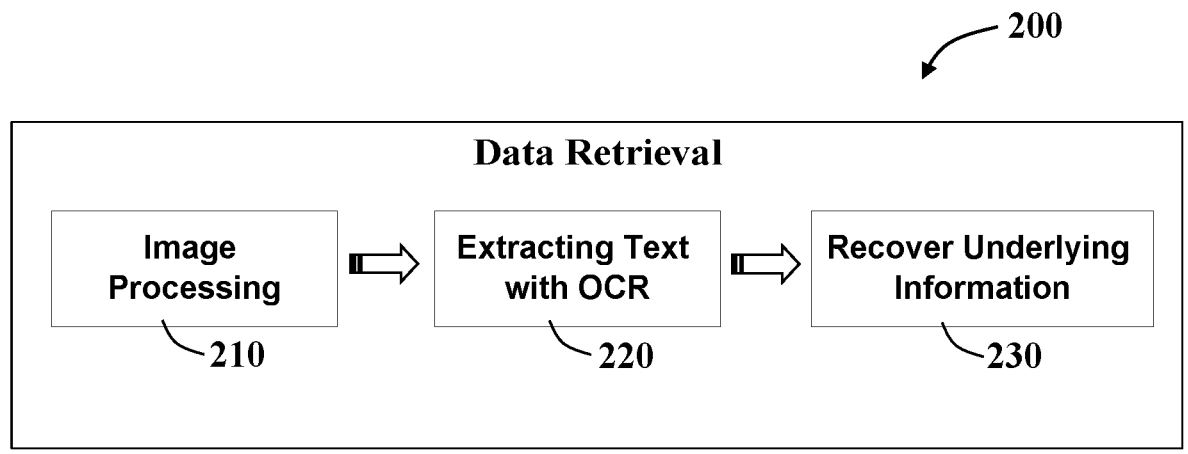
FIG. 2 is a flowchart representing selected actions illustrating a possible method configured for data retrieval from a digital invoice.

Reference is now made to FIG. 2, there is provided a flowchart representing selected actions illustrating a possible method configured for data retrieval from a digital invoice, for a business traveler usage, which is generally indicated at 200, for managing traveling expenses. It specifically noted that tracking business expenses using scanned invoice images is a widespread practice in the organizational finance world. As a result, extracting accounting data from invoice images has been a central pursuit in automatic document analysis over the past three decades.

The method 200 includes the following steps:

In step 210—performing image processing, where the input is an image of a digital invoice and generate an enhanced invoice image.

In step 220—extracting text with an optical character recognition (OCR) device; and In step 230—recovering the underlying information. Understanding the relationship between the format of the text and the layout is a crucial step in accurate information retrieval. For example, the sum "$10.99" in a US receipt will likely appear to the right of the word "Total:" or "Amount due:" and follows the canonical format "$NN.NN".

Figure 3:
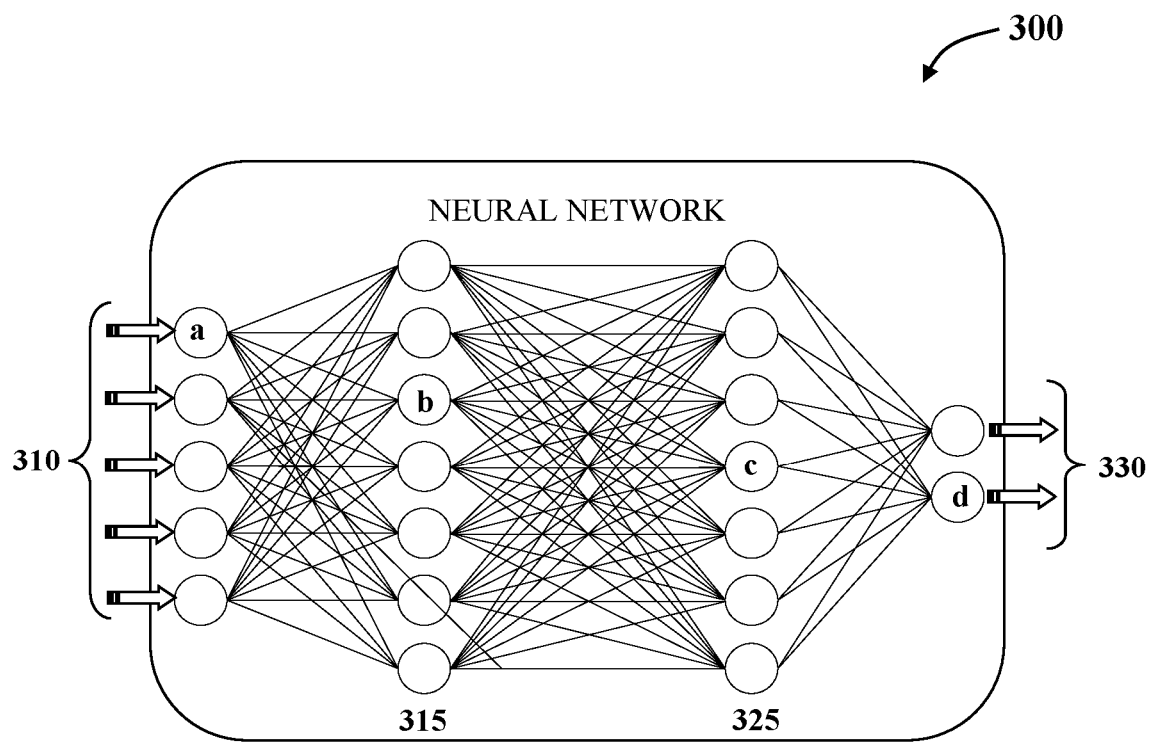
FIG. 3 is a general schematic block diagram representing a model of a simple neural network.

Reference is now made to FIG. 3, there is provided a general schematic block diagram representing a model of a simple neural network, which is generally indicated at 300, for recognizing underlying relationships in a set of data through a process that mimics the way the human brain operates.

The neural network 300 is an interconnected group of nodes, where each circular node, such as a, b, c and d, represents an artificial neuron and an arrow represents a connection from the output of one artificial neuron to the input of another neuron. Furthermore, neural networks may adapt to changing input so the network generates the best possible result without needing to redesign the output criteria.

The model of a simple neural network 300 includes an input layer 310 with an associated node 'a', a hidden layer(s) identified by layers 315 with an associated node 'b' and 325 with an associated node 'c' and an output layer 330 with an associated node 'd'.

It is noted that neural networks may be combined with deep learning to provide solutions to many problems in image recognition. Neural network is biologically-inspired programming paradigm which enables a computer to learn from observational data and deep learning is a set of techniques for learning in neural networks.

It is further noted that recurrent neural networks (RNN) are networks with loops in them, allowing information to persist. A loop allows information to be passed from one step of the network to the next. A recurrent neural network can be thought of as multiple copies of the same network, each passing a message to a successor.

Figure 4A:
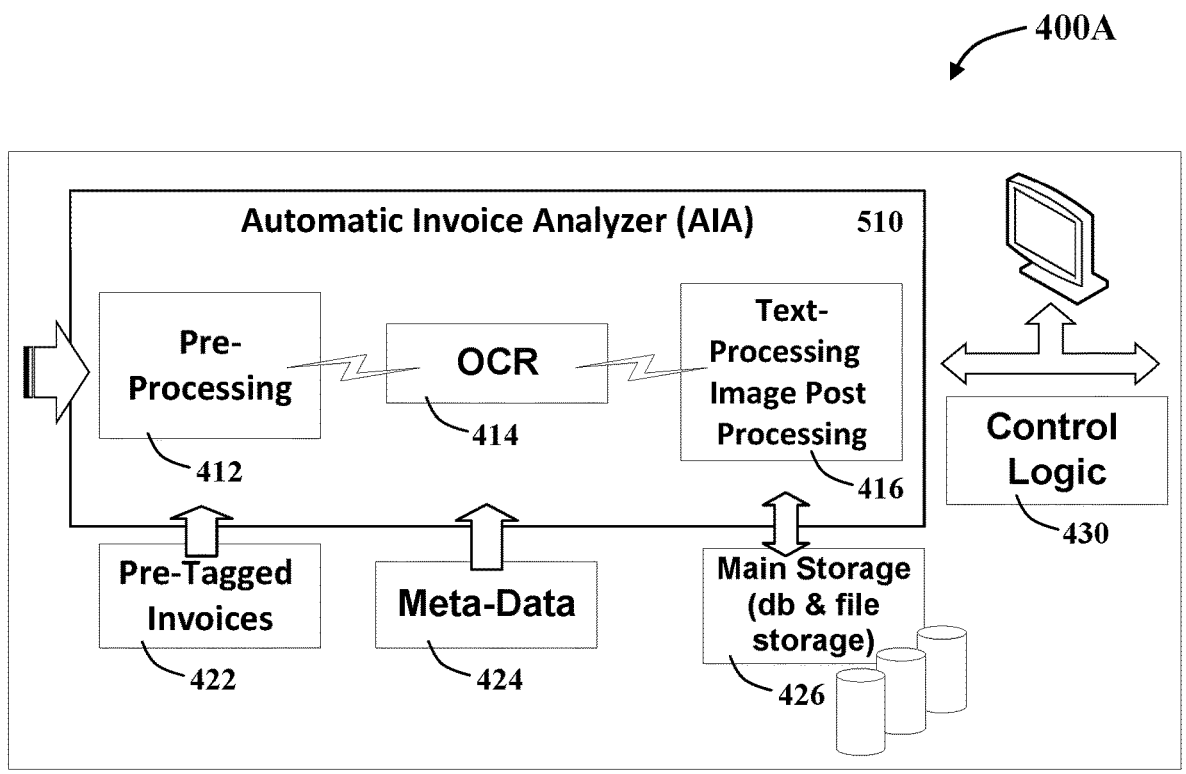
FIG. 4A is a flowchart representing selected actions illustrating a possible method configured for analyzing an imaged business document comprising at least one invoice.

Reference is now made to FIG. 4A, there is provided a flowchart representing selected actions illustrating a possible method configured for analyzing an imaged business document comprising at least one invoice, which is generally indicated at 400A, for use in an Automatic Invoice Analyzer (AIA) 410.

The method 400A may be triggered by executing a software application installed on the automatic invoice analyzer (AIA) 410 operable to perform automated analysis of at least one invoice to generate at least one semantic element. The method 400A includes the following steps: performing pre-processing—step 412; applying a dedicated OCR functionality to the input invoice image—step 414; and performing text processing and image post-processing—step 416.

The automatic invoice analyzer (AIA) 410 is further operable to reading pre-tagged invoices—step 422, reading meta-data—step 424, and communicating with the main storage comprising database and file storage—step 426. The automatic invoice analyzer (AIA) 410 may further communicate with a control logic unit 430.

Figure 4B:
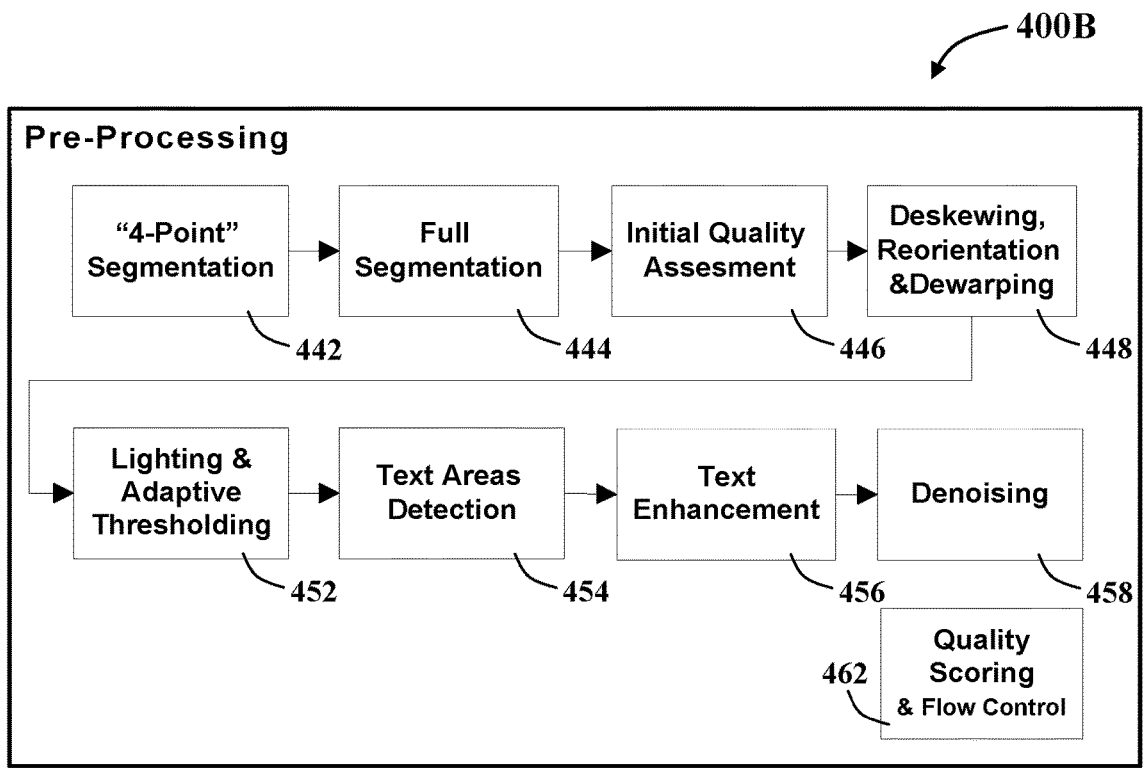
FIG. 4B is a flowchart representing selected actions illustrating a possible method configured for pre-processing an imaged business document comprising at least one invoice.

Reference is now made to FIG. 4B, there is provided a flowchart representing selected actions illustrating a possible method configured for pre-processing an imaged business document comprising at least one invoice, which is generally indicated at 400B, for use in an Automatic Invoice Analyzer (AIA) 410 (FIG. 4A).

The method 400B may be triggered by executing a software application installed on the automatic invoice analyzer (AIA) 410 (FIG. 4A) operable to perform automated pre-processing analysis of at least one invoice. The method 400B includes the following steps: performing "4-point" segmentation—step 442; performing full segmentation—step 444; performing initial quality assessment—step 446; performing deskewing, reorientation, and dewarping—step 448; performing lighting and adaptive thresholding—step 452; detecting text areas—step 454; performing text enhancement—step 456; performing denoising—step 458; and finally, performing quality scoring and flow control—step 462.

It is noted that within the pre-processing phase "4-point" segmentation; performing deskewing, reorientation, and dewarping; performing lighting and adaptive thresholding; and performing text enhancement may use computer vision algorithms. The steps of performing full segmentation; performing initial quality assessment; detecting text areas; and performing denoising may use computer vision based upon machine learning algorithms and may further use neural networks or deep learning algorithms.

Figure 4C:
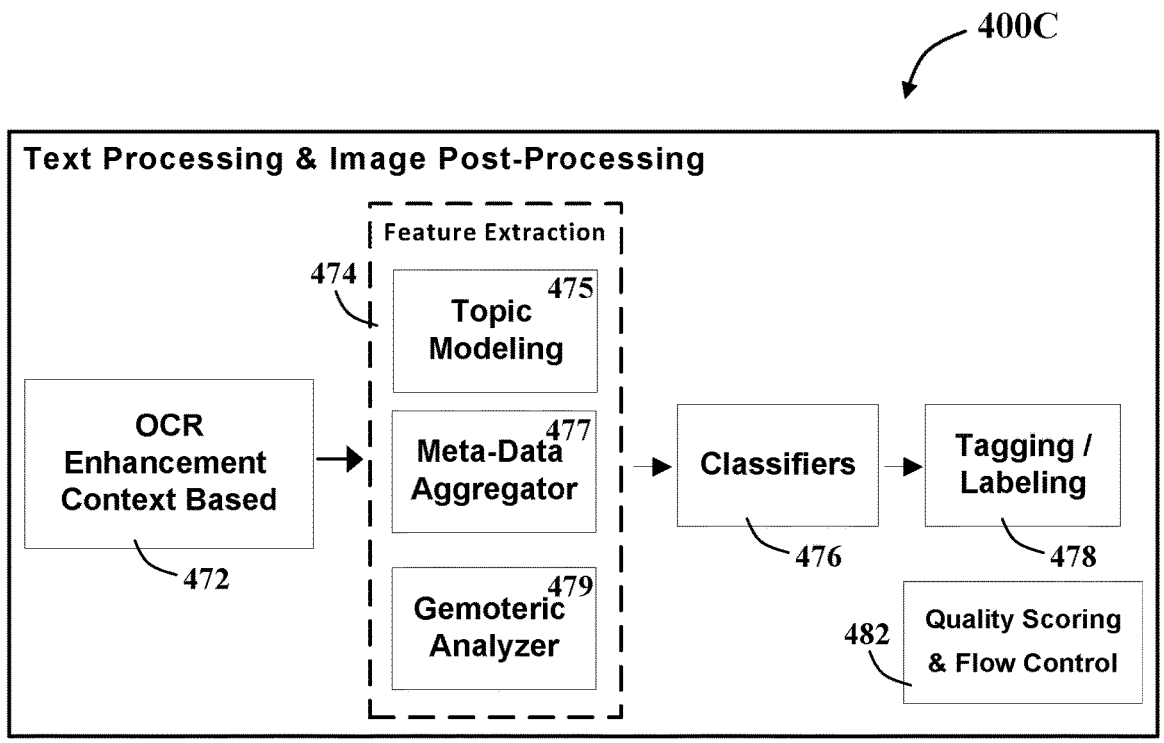
FIG. 4C is a flowchart representing selected actions illustrating a possible method configured for text processing and image post-processing.

Reference is now made to FIG. 4C, there is provided a flowchart representing selected actions illustrating a possible method configured for text processing and image post-processing for an imaged business document comprising at least one invoice, which is generally indicated at 400C, for use in an Automatic Invoice Analyzer (AIA) 410 (FIG. 4A).

The method 400C may be triggered by executing a software application installed on the automatic invoice analyzer (AIA) 410 (FIG. 4A) operable to perform automated text processing and image post-processing analysis of at least one invoice. The method 400C includes the following steps: performing OCR enhancement context based—step 472; extracting features from the invoice image—step 474; performing classification via various classifiers—step 476; performing tagging and labeling—step 478; and finally, performing quality scoring and flow control—step 482.

The step extracting features from invoice image—step 474, configured to generating topic modeling—step 475; aggregating meta-data via the meta-data aggregator—step 477; and performing geometric analysis via the geometric analyzer.

It is noted that within the post-processing phase performing OCR enhancement context based; performing topic modeling; aggregating meta-data; and performing classifications use language processing algorithms, based on machine learning.

The steps of performing geometric analysis; and performing tagging and labeling may use geometric analysis based upon machine learning algorithms and further based upon deep learning.

Figure 5:
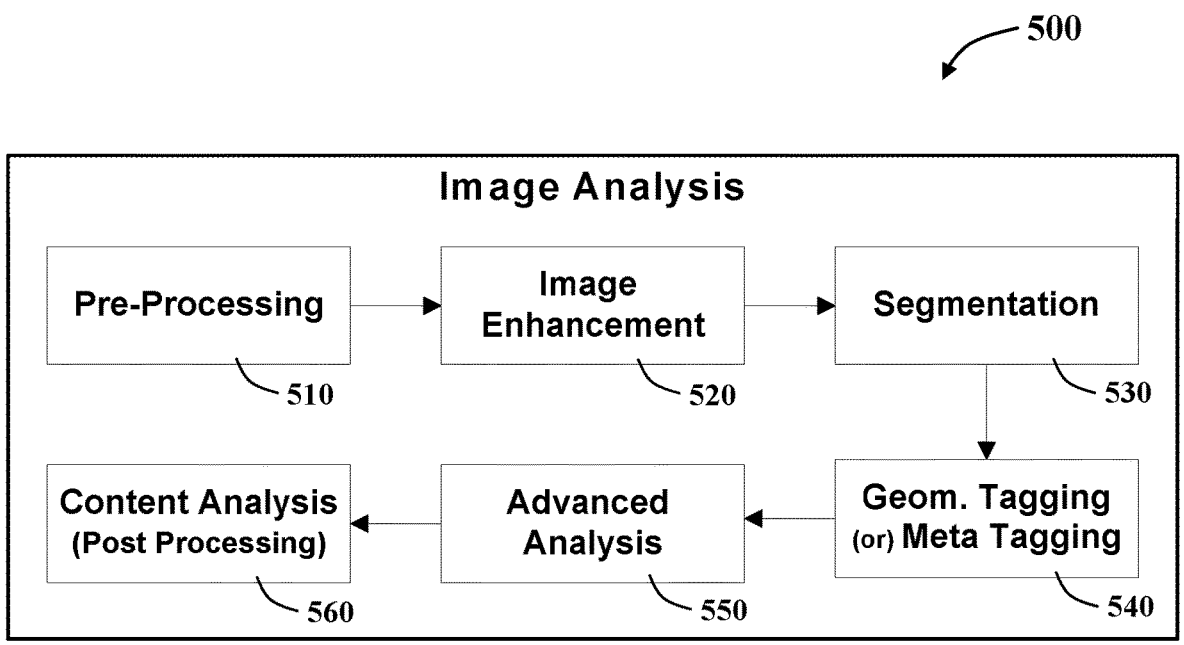
FIG. 5 is a flowchart representing selected actions illustrating a possible method configured for image analysis.

Reference is now made to FIG. 5, there is provided a flowchart representing selected actions illustrating a possible method configured for image analysis of an imaged business document comprising at least one invoice, which is generally indicated at 500, for managing traveling expenses. The method 500 covers an exemplified processing method and is presented by way of example.

The method 500 may be triggered by executing a software application installed on an automatic invoice analyzer (AIA) operable to perform automated analysis of at least one invoice to generate at least one semantic element. The method 500 includes the following steps: performing pre-processing—step 510; performing image enhancement—step 520; performing segmentation—step 530; performing geometrical tagging or meta tagging—step 540; performing advanced analysis—step 550; and performing content analysis—step 560.

In step 510—performing pre-processing, which may use various algorithms and mechanisms for pre-processing the image data in order to consider and handle at least the following activities: performing harsh lighting; crumpled/folded paper reconstruction; unfocused image operable for deconvolution using a deep CNN; normalized coordinate space for rectangular pixels; finding and eliminating pen markings over printed receipts such as circling, underlining, "V" marking and the like; performing four point including machine learning candidate edges and sequential scan of long invoices, panorama style; performing adaptive thresholding, including choosing parameters for image, not magic numbers, activating cost function to maximize the whitespace, maintain the structure/edges and the like, and Nimrod's gradient-space adaptive threshold; detecting human-oriented background; identifying some colors which are usually a background; performing super-resolution.

In step 520—performing image enhancement for reconstructing "original" from known data: similar images, true originals (such as word, PDF); identifying and removing known noise from a single source, such as a single (noisy) scanner used for a plurality of invoices; using known "standard fonts" of receipt machines for reconstruction and OCR; looking "See-through" receipts, when a slip is attached over an invoice, but can still see a little through the slip to the underlying paper in the scan (bleed through); and reconstructing the underlying image.

In step 530—performing segmentation to split a multi-invoice image into several images, one per invoice, possibly based on local rotation, textural features, fonts and the like; generating a segment "white on white" using learning of standard receipt/invoice margins; handling wholly non-rectangular receipts such as train tickets having rounded or chamfered corners; identifying tickets or receipts cut out from a roll and broken off at perforation (or torn off by hand) thus creating very bad/non-rectangular edges for the paper; detecting "punch holes" (from a hole punch) and use rectification; finding barcodes and use the lines for rectification. (note—find non-text lines and use for rectification); detecting stapler pins and use to detect "slip on invoice" situations. They can also be used for segmentation and rectification (as they are usually perpendicular or at 45 deg); detecting stapled papers "45 deg fold"; and performing real-time segmentation on mobile devices.

In step 540—performing geometrical tagging or meta tagging configured to assigning labels to whole receipt or specific fields of the invoice; utilizing font size/face in invoices: in many cases the total is in a larger/different font; using "Softmax" variant for tagging operable for deep tagging: tag heatmaps with deep NN, combine embedded OCR results (char-level embedding?) with image; heatmaps ('fuzzy tagging') may be used for hierarchical tagging such as to find headers, tables and the like; learning layout, using "skip-gram" to give a network just words to place them in an image such that it creates an invoice; using VAEGAN for layout learning and example generation. Auto encoder can be used to embed images in smaller space for features, GAN discriminator can be used for layout detection; holistic tagging: give tag for every single character in the receipt instead of just "important" fields; accounting based logic (recurrent validation); arithmetic constraints in invoice fields, performing: build system of interconnected equations from fields (Tot=sub.tot+tax and the like), using known values for tax (from country detection), using reasonable upper and lower bound, using OCR probabilities; and meta tag learning from context (T&E) associated with location: mobile location, trip location metadata, currency: location, textual features (symbols), language: location (trip), using user free-text notes field from application; supplier/vendor: use phone number; splitting rect joiner: human tagging via deep network with CNN and embedding.

In step 540—performing advanced analysis for detecting if invoice is on "carbon paper", then notify the user the invoice will fade if not submitted shortly; and progressive scan of very long invoices. The system may let the user move down the invoice and put things together in software (like panoramas and the like of mobile device camera applications; combining multi-page invoices into a single file; retrieving invoice image by using another invoice image as a query and precise image-image registration to find repeating of invoices: fraud, or mistakes; using convolutional neural network (CNN) to recognize company logos; using QR encoded information (as found in, for example, Austrian invoices) to replace ML tagging; using presence of QR codes as location prediction feature; detecting language from image (and not text); using Google queries on partial invoice text (suspected supplier name) to gain higher confidence/more data; testing confidence levels to perform human tagging of "hardness of receipt" (regression); deep tagger softmax probabilities; boosting layer softmax probabilities; and using driver for: AIA vs. Human control and completion station adaptive routing (human vs. computer tagging) user feedback to suggest manual correction over our results and check internal measure.

In step 560—performing content analysis, using methods considered related to post-processing of the content in the invoices such as improving OCR, fraud detection, language processing, VAT reclaim and the like. Accordingly, the system may be operable to: using of RNN for 'spelling' correction on OCR results; finding the "Total Sum" without a "Total Label"; detecting method of payment such as credit card, cash payment and the like; applying further classification methods associated with image features such as train tickets, restaurant invoices, taxi invoices and the like, and further to classify by fonts, invoice paper shape and more; reconstructing "Total Sum" from invoices which list net amount and VAT separately (but never their sum) such as Dutch train tickets; using information from previous trip expenses new predictions. Example—if user is in a hotel in Paris, his restaurant bills are more likely to be from the region as well; if company has deals with specific suppliers in the region, notify user and further notify company if user choses other suppliers instead; and determining multiple currencies on the same invoice.

Image context analysis may also be operable to detecting fraud/mistake; further data analysis and monitoring; deep tagging; proxy training; learning from context; and determining confidence level.

It is noted that the automatic information analyzer (AIA) is further operable to perform fraud/mistake detection, proxy training and deep tagging and determine confidence level.

For fraud/mistake detection, the analyzer may mark unusual expenses, such as user eating at same restaurant as his peers used in the past, yet paying extremely higher prices, or user eating in multiple different restaurants in the same day and more. Furthermore, discovering and deducting company-specific 'unapproved' items from invoice refund amounts such as using the hotel Spa, consuming alcohol during lunch and the like.

Confidence Levels:

The automatic information analyzer (AIA) responses come with a confidence level. These values may be used to direct further workflow, provide user feedback and the like. For example, decide whether or not an invoice should go to the human control and completion station. Further, decide whether or not to alert the user that a field is more likely to contain errors. As appropriate, allows passing of an invoice through multiple pipelines, pick result with highest confidence. Invoices with low confidence level may receive high priority for tagging so they can be learned from.

Learning from Context:

The automatic information analyzer (AIA) may use meta tag learning from context (T&E) to better read the invoice fields, such as learning of location, currency, language and may also use user free-text notes field from apps.

Location may use mobile location, trip location meta data and the like. Similarly, currency may use the location or other textual features or symbols, and language may be determined by the location and trip information. Additionally, use external information about the trip, user, company, phone data to aid in predictions about the invoice image and the like.

For example, user flight destinations are included in the trip information. It is very likely an invoice is from the destination country/a nearby country/the user's origin country. Currency and language are likewise highly dependent on location. Further, users sometimes add text-notes to their expenses with relevant information such as, they use them to remind themselves a Japanese invoice was for a train. As appropriate, time of the day may be indicative of the expense type, if the invoice was taken in real time. As appropriate, difference between phone time and server time may tell the user's time-zone, which may aid in detecting the location or currency or language. Additionally, user's previous journeys may be indicative of his future ones and hotels may be similarly priced, for example, and company's previous journeys of other employees may be indicative of a new employee current journey and, for example, company employees may stay in similar hotels.

Figure 6A:
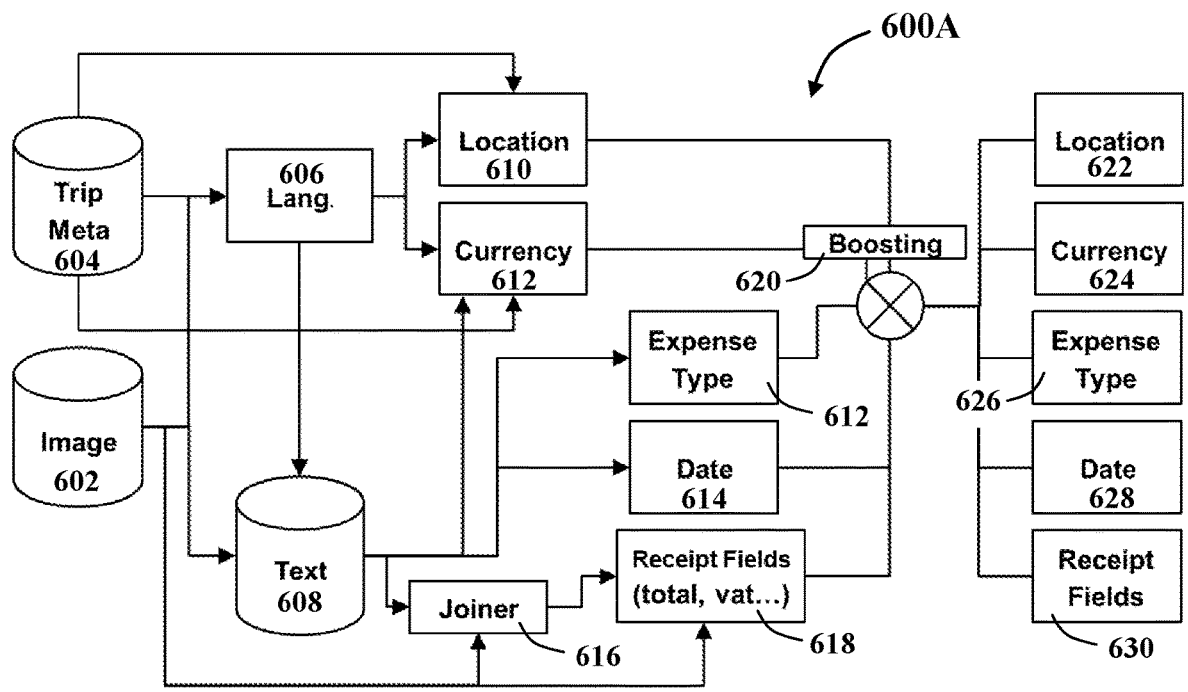
FIG. 6A is a schematic block diagram representing a learning mechanism for meta tag learning from context.

Reference is now made to FIG. 6A, there is provided a general schematic block diagram representing a learning mechanism, which is generally indicated at 600A, for meta tag learning from context, by the automatic information analyzer (AIA) according to one embodiment of the current disclosure. The learning mechanism 600A is operable to read invoice images from an associated data repository 604 including trip meta data and an invoice image from an associated image repository 602. Further, determine the language via a language module 606, gather textual information into a text repository 608 and further use of a joiner 616 to generate necessary information of location 622, currency 624, expense type 626, associated date 628 and the various invoice fields 630.

Figure 6B:
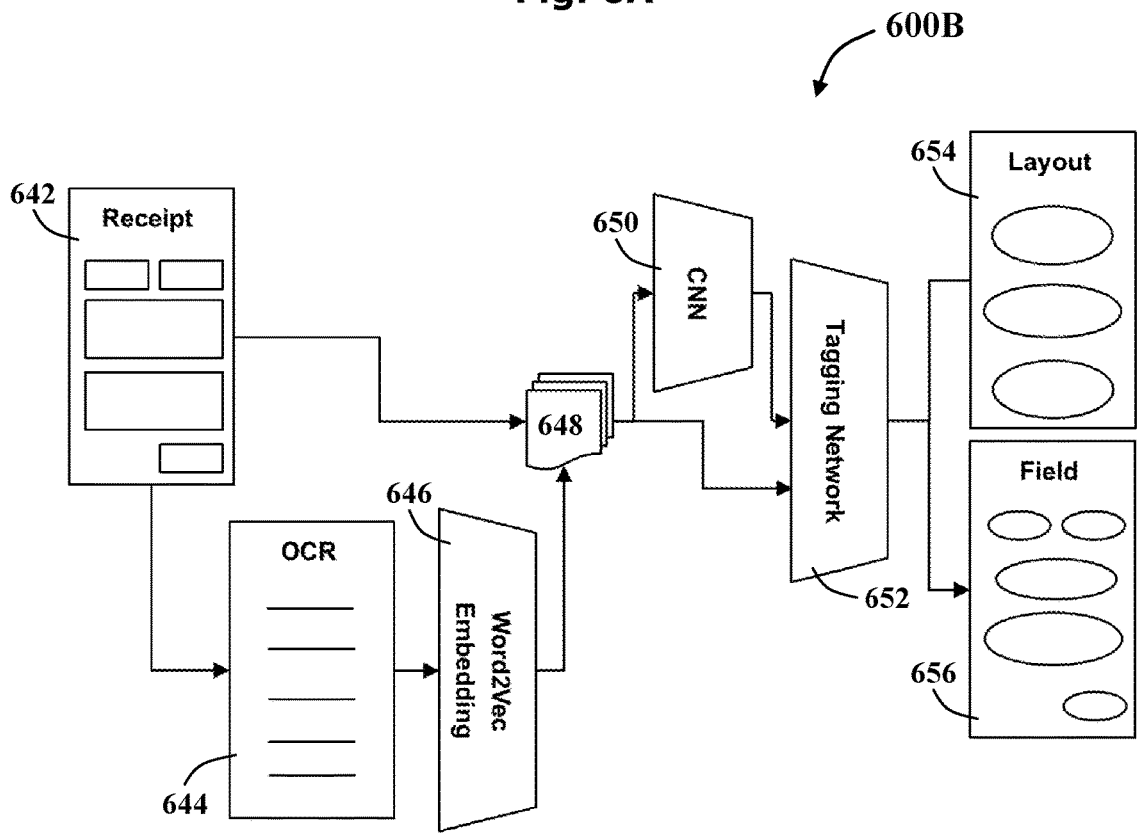
FIG. 6B is a schematic block diagram representing an analysis mechanism, for determining invoice layout and appropriate invoice field.

Deep Tagging:

Reference is now made to FIG. 6B, there is provided a general schematic block diagram representing an analysis mechanism, which is generally indicated at 600B, for deterring invoice layout and appropriate invoice fields, by the automatic information analyzer (AIA), according to one embodiment of the current disclosure.

The analysis mechanism 600B is operable to use a Char2Vec model 646 to embed OCR information as extra image channels. For example, the value of a specific pixel in the 'embedding channels' would be the embedding of the word/character which is located at that pixel. If for example, embedding is in 3d space, this would be equivalent to creating a 3-color image where the area of each letter (or word) has a different color, and similar or related words share similar colors.

Thus, the original invoice image 642 and the embedding channels 646 are passed into a convolutional neural network (CNN), such that it may extract deeper relational meanings from locations, image properties and the word-content of the invoice image. The result may be a 'heatmap', showing the probability that each pixel in the image belongs to a certain class (such as the 'Total Amount').

As appropriate, this may also be used for hierarchical tagging, for finding headers in the invoice image, or tables, expense items and the like to extract the layout 654 and field information 656.

It is noted that image recognition is not an easy task to achieve. One way to solve this problem would be through the utilization of neural networks. The application of convolutional neural networks (CNNs) may make even huge images more manageable. Further, Image classification is the task of taking an input image and outputting a class (a cat, dog, etc) or a probability of classes that best describes the image. For humans, this task of recognition is one of the first skills we learn from the moment we are born.

Proxy Training:

For proxy training, the automatic information analyzer may use smaller proxy problems to train subsets of the network, such as for layout learning, variational auto encoders and generational adversarial networks (VAE-GAN) and more.

Figure 7A:
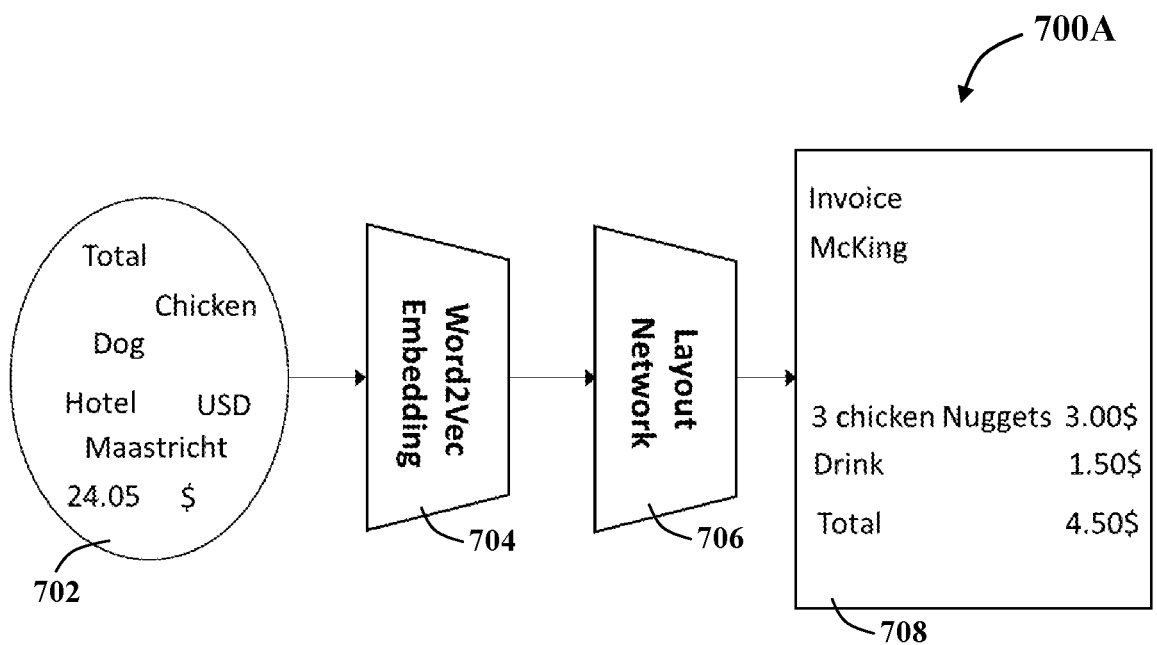
FIG. 7A is a schematic block diagram representing layout learning used in an image analysis mechanism.

Reference is now made to FIG. 7A, there is provided a general schematic block diagram representing layout learning used in an image analysis mechanism, which is generally indicated at 700A, according to one embodiment of the current disclosure.

For layout learning, the analyzer may use a network learning to generate an invoice image from its word content. The network receives a list of words 702, or their embedding via the Char2Vec 704 and the layout network 706 and is operable to correctly guessing their coordinates on the invoice image 708. This sort of network is likely to learn features such as word proximities, left-of/right-of relations, relative text sizes, general locations of specific repeated words and more. The lower layers of such a network may be then exploited for extracting features from image words, or a possible way to do further word embeddings.

Alternatively, the network may receive an image of an invoice (+embedded OCR) with some missing words, and has to guess which words are expected in the blanks.

Figure 7B:
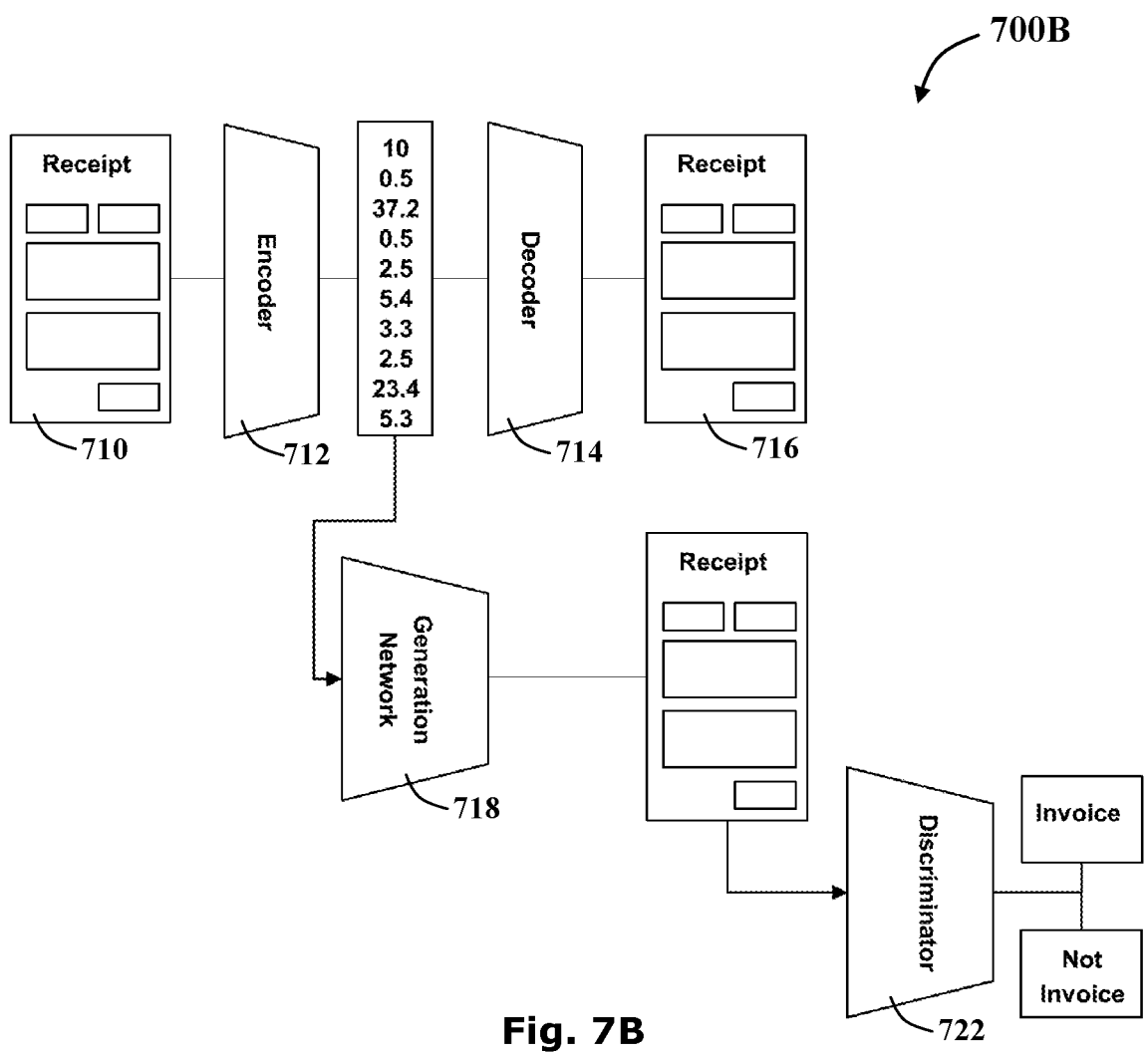
FIG. 7B is a schematic block diagram representing variational auto encoders and generational adversarial networks (VAE-GAN) used in an image analysis mechanism.

Reference is now made to FIG. 7B, there is provided general schematic block diagram representing variational auto encoders and generational adversarial networks (VAE-GAN) used in an image analysis mechanism, which is generally indicated at 700B, according to one embodiment of the current disclosure.

For variational auto encoders and generational adversarial networks (VAE-GAN), the auto-encoder 712 learns to create a denser representation of the invoice image 710 which may then be decoded into the origin by the decoder 714. This may be used to reduce the size of input images while retaining as much as possible of the important information required to reconstruct it. The decoder 714 may also be used in training a generational network, which will learn to create new invoice images 716. These could later be trained on (if they have sufficient quality). Furthermore, the discriminator part 722 of the network may be later used to detect and segment invoices from invoice images.

It is particularly noted that the current invention introduces a method that combines visual and linguistic features for automatic information retrieval from receipt images using deep network architectures, which outperforms naive approaches. Our Skip-Rect Embedding (SRE) descriptor is demonstrated in two canonical applications for receipt information retrieval: field extraction and Optical Character Recognition (OCR) error enhancement.

It is noted that tracking business expenses using scanned receipt images is a widespread practice in the organizational finance world. As a result, extracting accounting data from receipt images has been a central pursuit in automatic document analysis over the past three decades. Data retrieval involves image processing, extracting text with OCR, and finally recovering the underlying information. Understanding the relationship between the format of the text and the layout is a crucial step in accurate information retrieval. For example, the sum "$10.99" in a US receipt will likely appear to the right of the word "Total:" or "Amount due:" and follows the canonical format "$NN.NN"

Figure 8A:
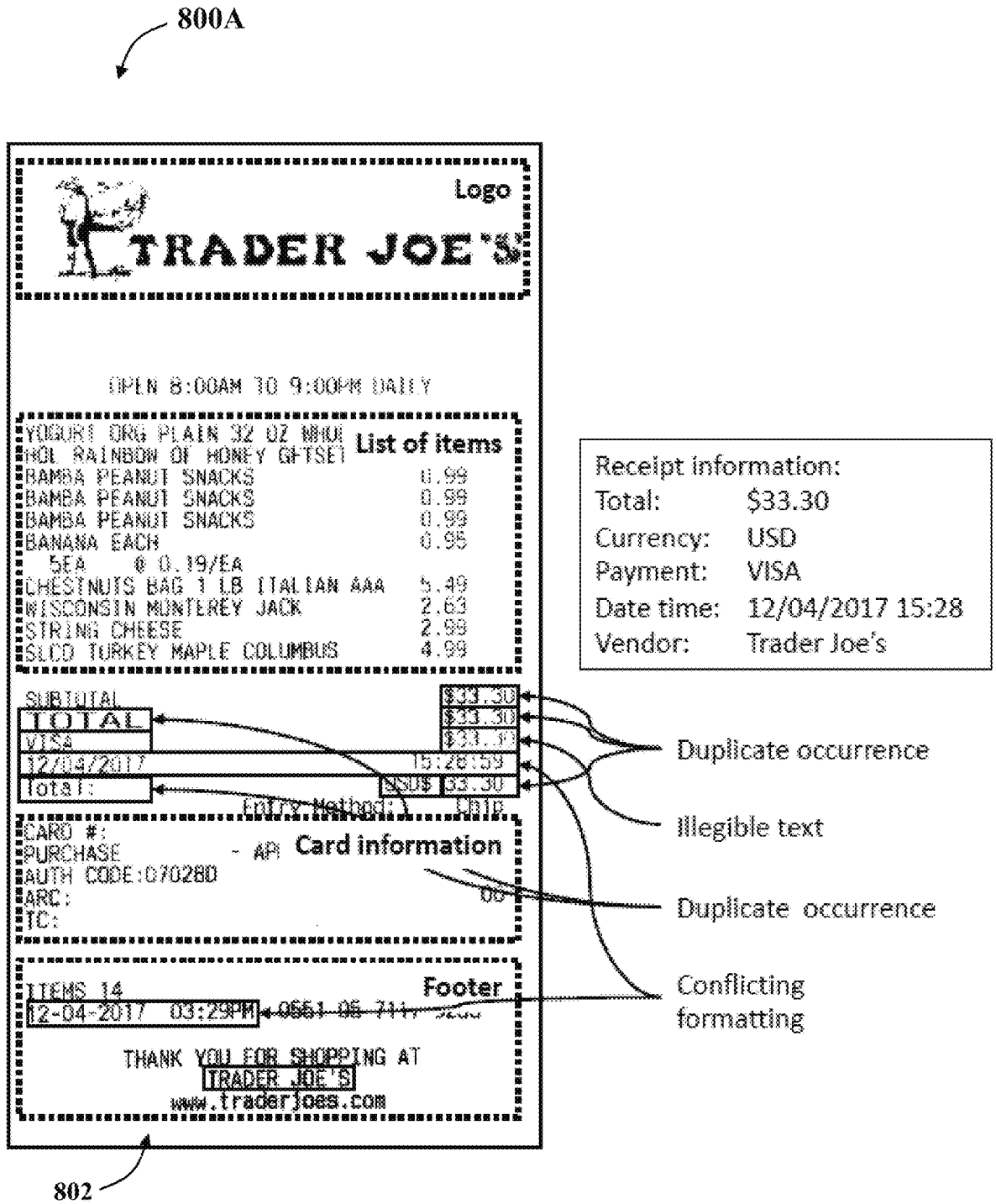
FIG. 8A is an example of an imaged invoices with relative locations of key information within the imaged invoice itself indicating various image analysis difficulties.

Reference is now made to FIG. 8A, there is provided an example of imaged invoices, which is generally indicated at 800A, with relative locations of key information within the imaged invoice 802 itself indicating various difficulties for performing image analysis of the invoice. Analysis difficulties for extracting information from an invoice stems from multiple source such as: duplicate information or duplicate occurrences, conflicting formatting, OCR-impossible text and warping from paper creasing. Additionally, difficulties may arise due to difficult backgrounds as shown in sub-image 804 (FIG. 8E), showing an example of text that is difficult to discern and other reasons as shown in 806 (FIG. 8F) image such as crippling of the invoice, showing a warped image.

Figure 8B:
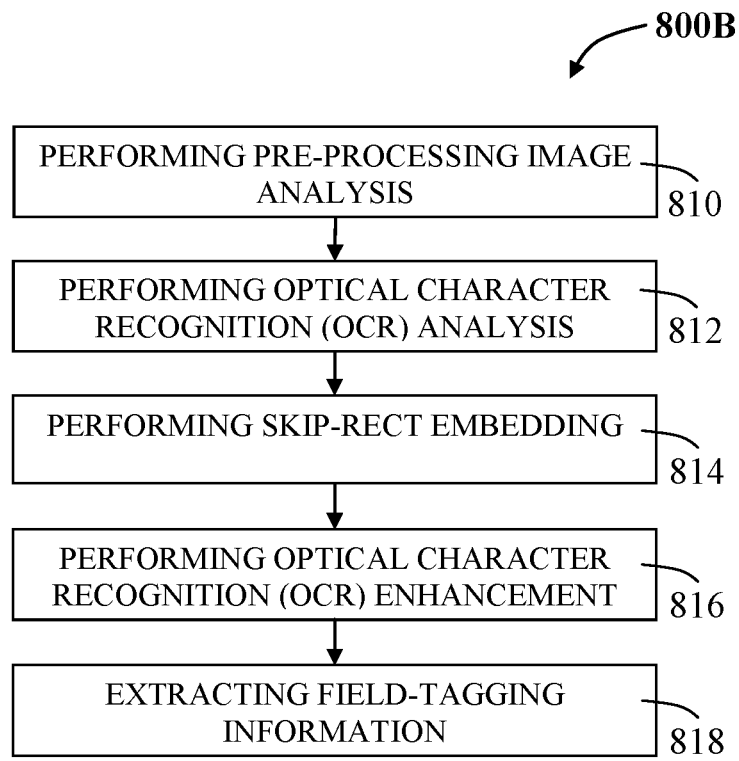
FIG. 8B is a schematic flowchart representing a method for analyzing a receipt image using the Skip-Rect Embedding (SRE) in an automatic information analyzer, according to embodiments of the current invention.
Figure 8C:
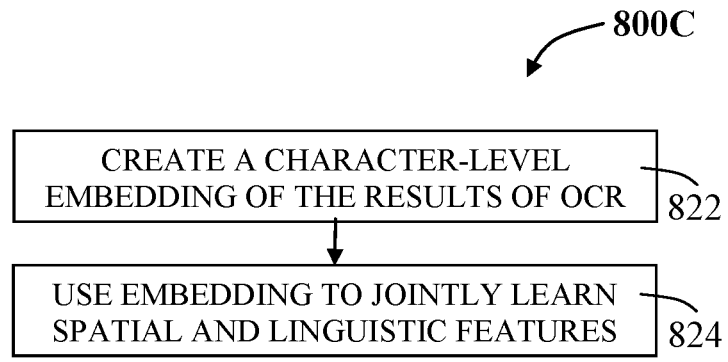
FIG. 8C is a flowchart representing selected actions illustrating a possible method configured for extracting information from invoice images.
Figure 8D:
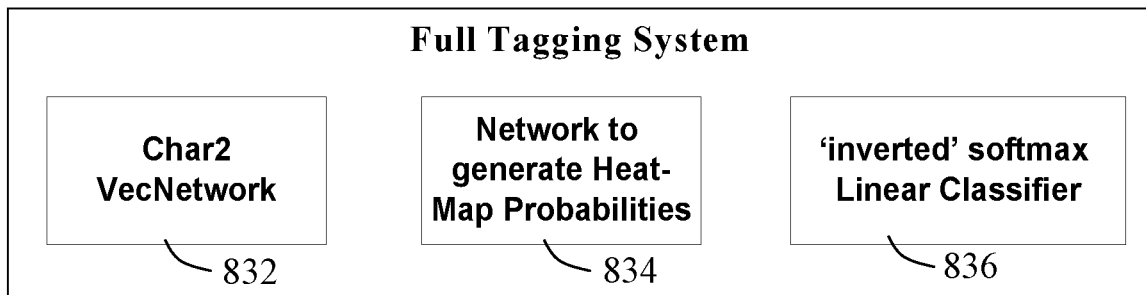
FIG. 8D is a schematic block diagram illustrating a possible full tagging system as part of an automatic information analyzer (AIA)
Figure 8E:
FIG. 8E shows an example of a receipt having an OCR-difficult background in which the text difficult to discern.
Figure 8F:
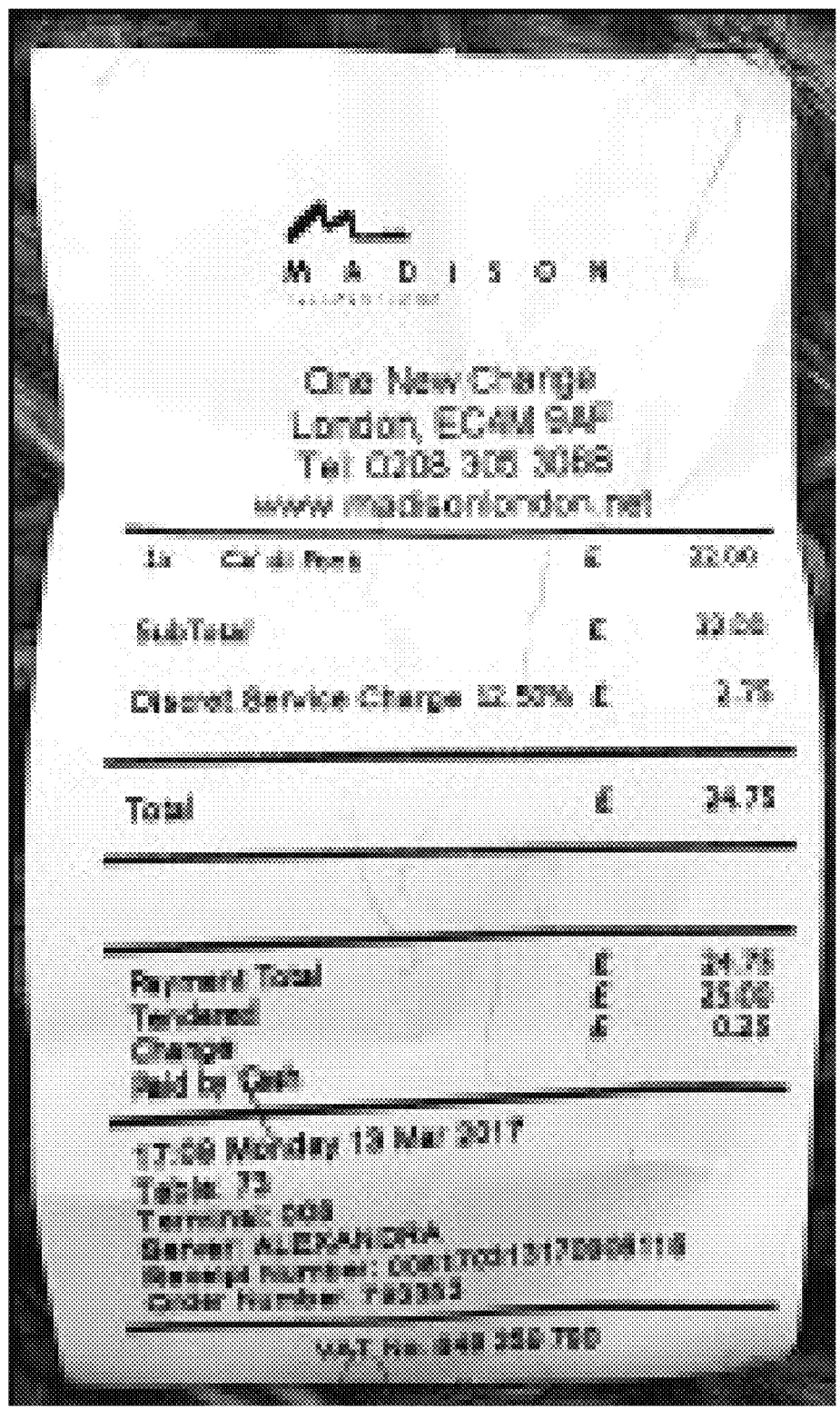
FIG. 8F shows an example of a crippled invoice in which the image is warped.

It is noted that analysis difficulties may arise from various reasons and FIGS. 8E and 8F are shown here by way of example only.

Reference is now made to FIG. 8B, there is provided a flowchart representing selected actions illustrating a possible method configured for analyzing a receipt image using the Skip-Rect Embedding (SRE) algorithm, which is generally indicated at 800B, as part of image analysis of an imaged business document comprising at least one invoice.

The method 800B may be triggered by executing a software application installed on an automatic invoice analyzer (AIA) operable to perform automated analysis of at least one invoice to extract field-tagging information. The method 800A includes the following steps: performing pre-processing image analysis—step 810; performing optical character recognition (OCR) analysis—step 812; performing Skip-Rect embedding—step 814; performing optical character recognition (OCR) enhancement—step 816; and extracting field-tagging information—step 818.

It is noted that such geometric relationships have been used in the past for information retrieval from invoices, the problem still stands as challenging for reasons such as OCR errors, non-axis-aligned imaging, non-horizontal language or the high variance of invoice document layouts and word vocabulary. As noted, a strong indicator of semantic meaning for words and data in an invoice document are the immediate neighbors, following common tabulated layout. However, the compounding error in geometry (such as warping, sparsity) and format (such as OCR mis-readings) break simple assumptive rule-based models or extraction using layout templates or graphs.

It is a particular feature of the current system that linguistic models for semantic analysis can be adapted geometrically to overcome problems arising in sparse structured documents. For example, in the absence of complete sentences in a receipt, the Skip-Gram method, which models semantic meaning using the company of the word, can be used geometrically to learn the relationship between sums (e.g. "$NN.NN") and their neighboring labels (e.g. "Total:"). Using a learnable joint model for both format and geometry, the suggested invention makes use of semantic information both in the language and the spatial domains for a higher-level understanding of the document. Accordingly, the suggested invention is operable to use Skip-Rect Embedding (SRE), a descriptor that jointly learns the relationship between textual format and spatial proximity in the OCR-enhanced image. It is shown that this descriptor is useful for several applications in document analysis and improves prediction over naive approaches.

An expected advantage of using an SRE descriptor enhancement, is that a deep network used to analyze the embedded document is relieved of the task of learning the meanings and relationships of visual glyphs and characters (in essence, performing OCR). The higher-level learning can be dedicated for solving the task at hand, such as finding the total sum in the invoice. This flexibility allows for the use of more powerful commercial or open source OCR software during the tagging pipeline, even if provided in 'black-box' format. However, this comes at a cost, since the top-level learning is only as good as the low-level embedding, which is suspect to noise from the external OCR operation (e.g. letters mis-read or words completely missing). For that purpose, we propose a character-level embedding (Char2Vec) for the words in the document, which is able to look past OCR mistakes. Such an embedding can be learned in an unsupervised fashion, leveraging considerably larger amounts of data. These data can be automatically generated from OCR results for invoice images, rather than the manual annotation required by networks responsible for higher level reasoning.

Reference is now made to FIG. 8C, there is provided a flowchart representing selected actions illustrating a possible method configured for extracting information from invoice images, which is generally indicated at 800C, as part of image analysis of an imaged business document comprising at least one invoice.

The method 800C may be triggered by executing a software application installed on an automatic invoice analyzer (AIA) operable to perform automated analysis of at least one invoice to extract field-tagging information. The method 800A includes the following steps: performing preprocessing image analysis—step 810; performing optical character recognition (OCR) analysis—step 812; performing Skip-Rect embedding—step 814; performing optical character recognition (OCR) enhancement—step 816; and extracting field-tagging information—step 818.

Accordingly, a method is taught herein for extracting information from receipt and invoice images by (1) creating a robust character-level embedding of the results of OCR, and (2) using this embedding to jointly learn spatial and linguistic features. We train our model using a mix of supervised and unsupervised techniques, with several innovations to control over- and under-fitting, as well as the sparse loss function. Since datasets for receipt image analysis are in a dire short supply, we built our own proprietary dataset that consists of 5,094 images of invoices with 23,013 human-tagged bits of information. We demonstrate our method's superiority over several baselines including an industry leading solution.

Reference is now made to FIG. 8D, there is provided a schematic block diagram illustrating a possible full tagging system, which is generally indicated at 800D, as part of image analysis of an imaged business document comprising at least one invoice. The full tagging system 800D includes:

A Char2Vec network 832 for generating word level embeddings from their character level content and geometric context. A generating network 834 for generating a heat-map of label probabilities using a base image overlaid with word-embedding data as generated by the Char2Vec network 832; and an 'inverted softmax' linear classifier 834 for determining the best candidate word to match for each label, based on the heat-map generated by the generating network 834 and a set of hand-crafted features.

Analyzing an image of an invoice requires reading the text as well as the document layout, and further understanding the relationship between the two entities. Several works for invoice image analysis systems have proposed methods utilizing spatial connections, such as 4-way proximity (right, left, above, below), to extract information from an invoice image. Some textual formatting considerations were suggested as well in form of regular expressions. However, machine learning based methods, while in existence, are not yet prolific. Unlike these methods the current invention is operable to learn the spatial and linguistic features jointly in a unified context.

Methods for invoice document image analysis, focusing on classification or segmentation, avoid using outputs of an OCR operation for the high level of errors, while the suggested method offers a solution. Another key feature in document image understanding requires layout analysis. Existing methods use convolutional approaches to study relationship between text and location. On the contrary, the suggested approach focuses on visual representations alone and do not incorporate a language model.

It is further noted that understanding an invoice image may need additional means to determine the semantic meaning of words, a word embedding method is being used. Embedding the meaning of words is a common pursuit in language processing. Some prolific methods for word embedding are known such as GLOVE, Skip-gram and continuous bag-of-words. However recently, various methods were proposed to perform Character-to-Vector (Char2Vec, C2V) embeddings using convolutional and recurrent approaches. Character-level embedding is especially useful when inter-character relationships are important. For example, Character-level embedding, may be used in language identification and part-of-speech tagging. Using an embedding for a language model is may also help in visual analysis, in applications such as visual relationship detection and image captioning.

Spatial Character-to-Vector (Char2Vec) Skip-Rect Embedding:

Linguistic embedding methods are concerned with finding a representation for the context in which a word resides, using neighboring words in the sentence, morphological clues or encyclopedic and dictionary-term proximity. The fundamental Word-to-Vector (Word2Vec) embeddings turn words encoded in arrays of characters to vectors of numbers. These embeddings have been shown to maintain semantic relations and meaningful distance metrics.

Figure 9A:
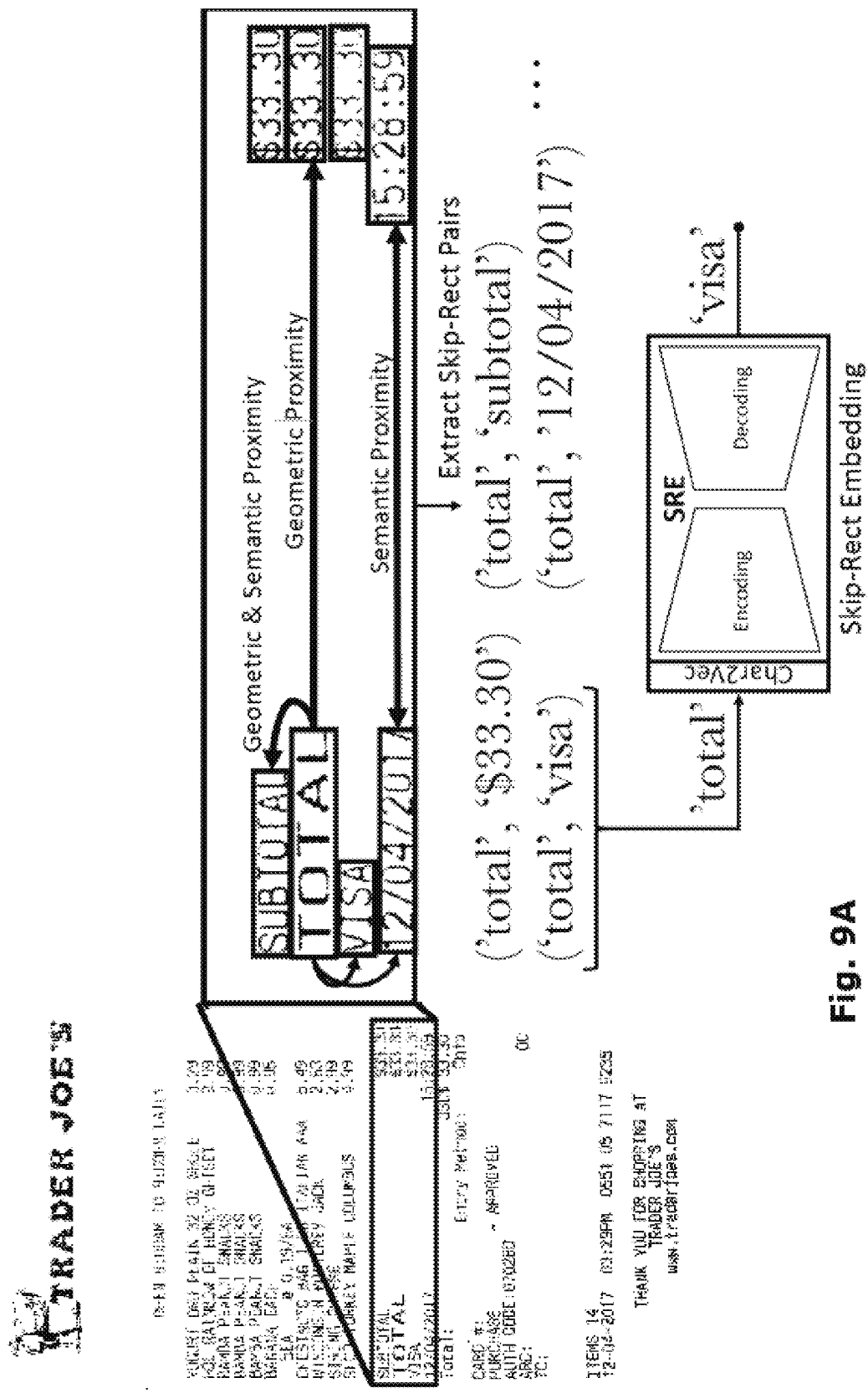
FIG. 9A represents a Skip-Rect Embedding method. Proxemic words in the image are paired, and a deep convolutional model seeks to find an optimal embedding that encodes both geometric and semantic consistency.

Reference is now made to FIG. 9A, there is provided a flow representing selected actions illustrating a possible method using Skip-Rect Embedding configured for extracting information from invoice images, which is generally indicated at 900A, as part of image analysis of an imaged business document comprising at least one invoice. The Skip-Rect Embedding method 900A is operable to pair proxemic words in the image and further uses a deep convolutional model seeking to find an optimal embedding that encodes both geometric and semantic consistency.

The method 900A may be triggered by executing a software application installed on an automatic invoice analyzer (AIA) operable to perform automated analysis of at least one invoice. The method 900A includes the following steps:

In the first step: finding an embedding which encapsulates similar semantic relations in an invoice image, where structured sentences are a rarity. A further complication, arising from dealing with OCR-generated text, is that a surprisingly large portion of about 35% of the text has been found to be misread or split (according to our experiments using the prolific Tesseract OCR engine on pre-processed, phone-captured images). This in turn leads to both a dilution in individual words occurrences (and an even larger dilution in the chance of two words appearing as neighbors), as well as a high probability of previously unseen words appearing in every new document. The standard practice of dealing with such unknowns in a Word2Vec model, is the addition of an 'unknown' word token, to which all unknown words are assigned. Given the high percentage of unknown words in the OCR results, this is no longer a viable option. A similar situation may be found in the literature in works relating to the analysis of Tweets, where Char2Vec models are instead employed to learn word embeddings from the character-level content of words.

In the second step: combing of morphologic character-level formative structure with geometric information in a sparse but structured document—an invoice. Character-level formative information, for example a date ('DD-MM-YYY') or a cash sum ('$00.00') is widespread in receipt documents, and geometric relations carry an equally important information as proxemic headings and labeling occurs very frequently, for example 'Subtotal: $10.50'.

The Embedding Model:

Taking inspiration from Skip-gram, the current method poses the input word vs. a neighboring target word in a pair and seeks to find an embedding that encodes this pair-wise relationship. For a neighbor, we use a 'word' (used hereafter to refer to any one string generated by the dedicated OCR) that is in an immediate geometric proximity to the input word in the invoice image. As an illustration, it is expected that the words that mean "Total" (for example the words: "Amount" or "Bedrag", "Total" in Dutch and the like) to appear next to actual amounts. The neighbor word is normalized: capitalization and punctuation removed and replaced with a dictionary index in a 1-hot encoding vector (of length 10,000).

Figure 9B:
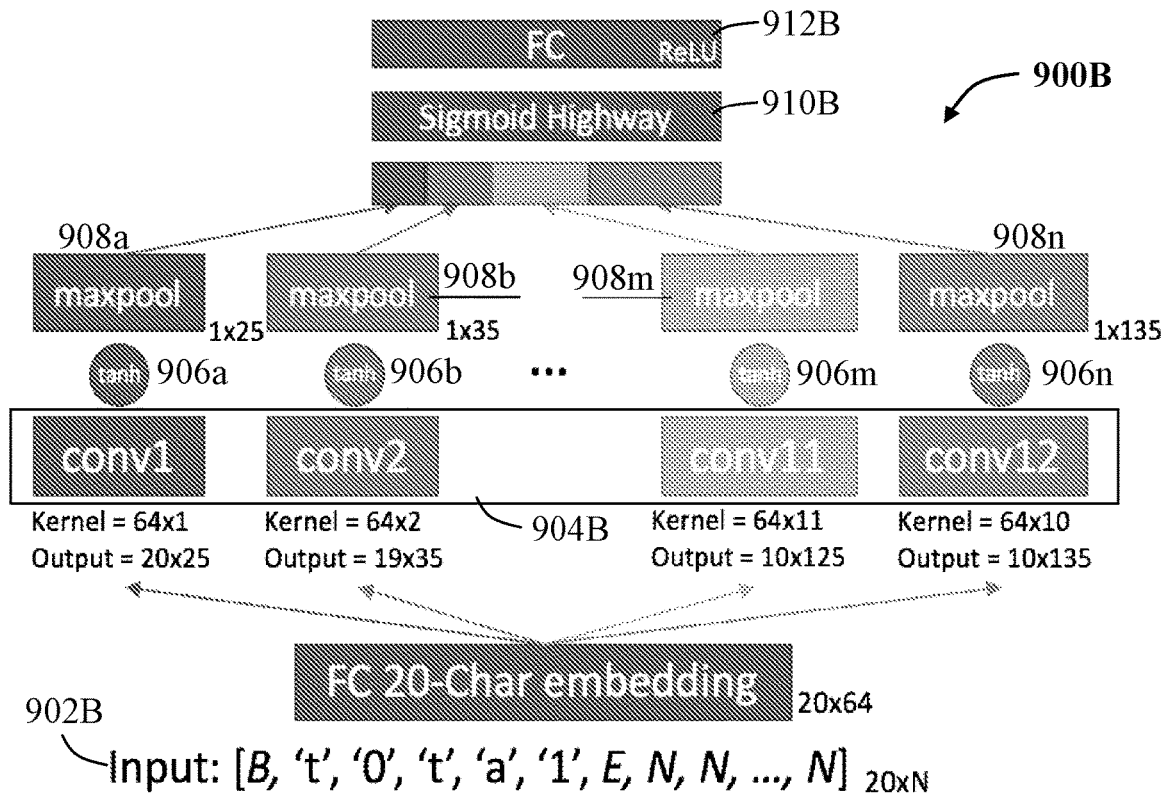
FIGS. 9B and 9C represent possible character-to-vector architecture used for embedding the words in the receipt image.
Figure 9C:
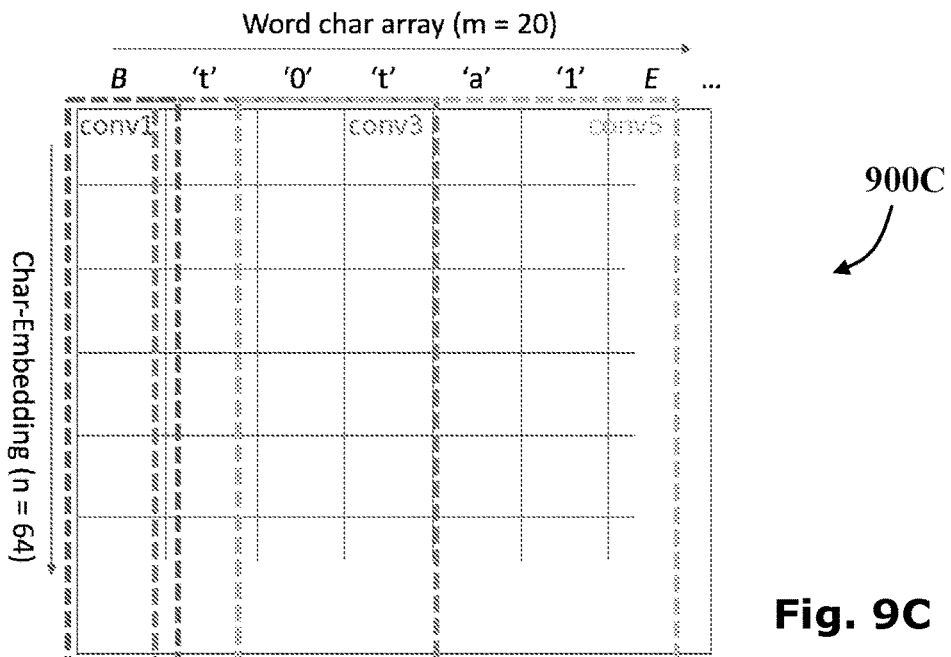

Reference is now made to FIGS. 9B and 9C, there is provided general schematic block diagrams representing an embedding architecture used in an image analysis mechanism, which is generally indicated at 900B and 900C, showing a possible character-to-vector architecture used for embedding the words in an invoice image, according to one embodiment of the current disclosure.

As shown in FIG. 9B, a fixed 20-entry vector 902B, is considered, for the character array in the input word using the ordinal number (UTF-8 code point) for each character. Thereafter a maximal code point value (UTF-8 encoding for the Euro sign) is designated, and replace any character with higher encoding by a special token ABOVE_MAX. Additionally, special tokens (BEGIN, END and NULL) may be added to denote beginning and end of a word, or an empty entry in the 20-entry vector respectively.

In total, there are 8368 possible values for each entry in the vector 902B. This vector is put through an initial embedding layer. Each character's ordinal is treated as an entry in a 1-hot vector, which is multiplied by a matrix of weights of size [8368×64], resulting in a numeric vector of 64 values for each letter. Subsequently, a Time-Delayed Convolutional Network 904B, with 12 convolutions of increasing lengths with tan h activation (906a, 906b, . . . 906m, 906n), is applied, followed by max-pooling (908a, 908b, . . . 908m, 908n), and concatenate all these into a single vector. The convolutions encode the sequential relationship between characters (essentially learning to recognize indicative n-grams). As appropriate, to get a compact representation all vectors are passed through a sigmoid highway layer 910B and a fully-connected layer 912B with ReLU activation, with a total of 256 output nodes. The result is the 256-dimensional embedding vector of the input word.

Figure 10:
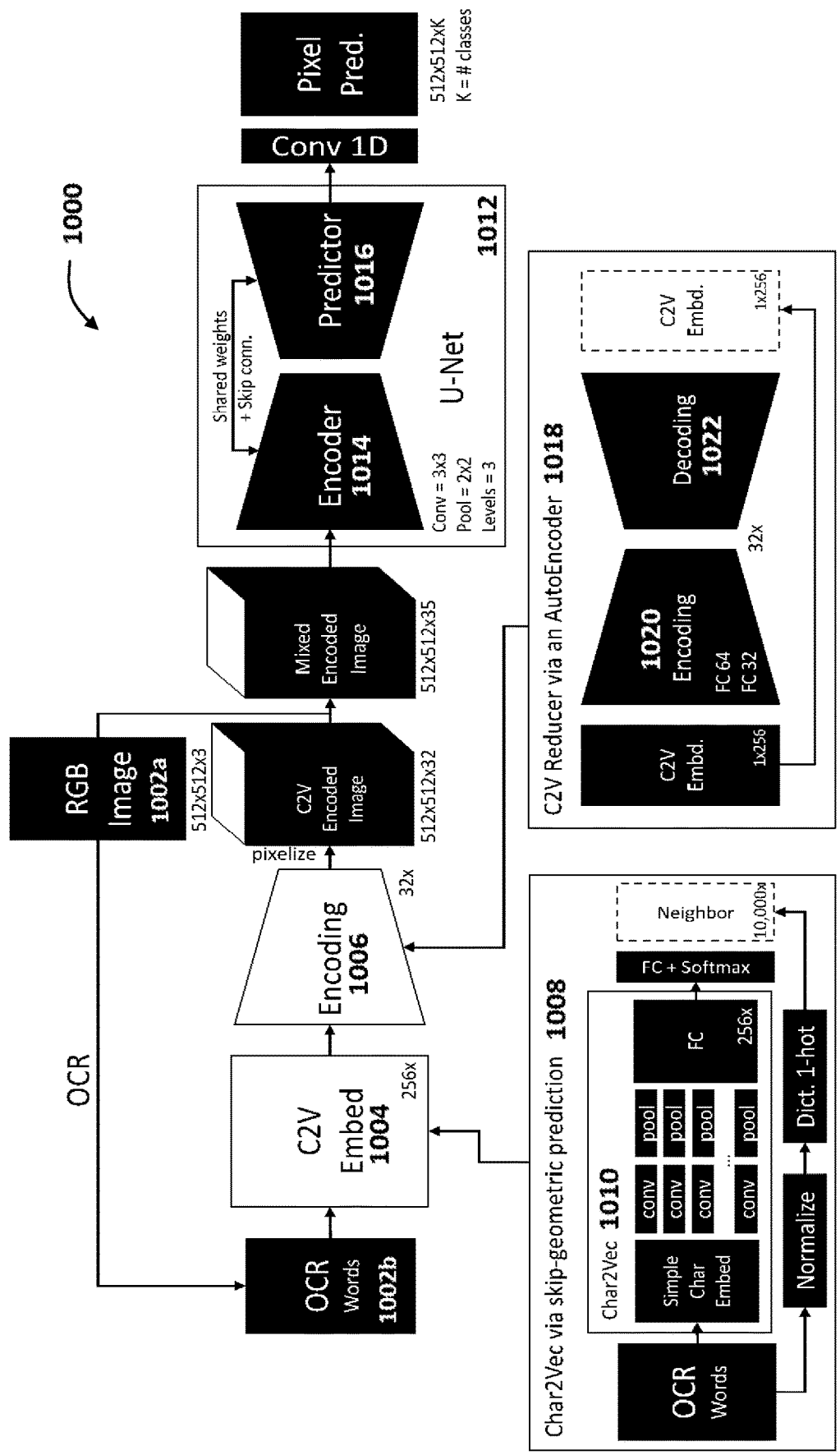
FIG. 10 is a schematic block diagram representing one possible system architecture of an encoder-decoder patterned convolutional network (U-Net), according to one embodiment of the current disclosure.

It is noted that for training the network, the embedding vector is passes through another fully-connected layer with 10,000 outputs (the same length as our 'neighbor' 1-hot vector). For a loss function, a softmax cross-entropy is used, where the result of this final layer is compared to the 1-hot encoding of the neighbor word, as illustrated in FIG. 10.

Creating the Data Set:

It is particularly noted that the embedding model may be trained in an unsupervised way separately from the rest of the image understanding pipeline, to allow using a larger dataset. One may use the 5,094 invoice images dataset and perform augmentation using synthetic image transformations and simulated noise to simulate receiving an order of 22,670 invoice images. Accordingly, the dedicated OCR software may be executed to run on each invoice image. In order to create a list of word pairs, a 2-dimensional KD-Tree is built from the center coordinates of each word's bounding rectangle, as determined by the dedicated OCR software. For each such word, one may then query the tree to find the 4 nearest neighbors, creating 4 pairs of 'input' (the original word) and 'target' words (its neighbors). As appropriate, filtering out pairs where the 'target' has a low occurrence rate (less than 10 total appearances throughout the entire corpus), or words with less than 4 characters that are not on a hand-picked whitelist. Thus, filtering out very short OCR-noise, occurring in all contexts and thus provide no real information. The whitelist may contain short words which are both common and hold special semantic meaning, such as 'VAT', 'tax' or 'due'. In total, current Char2Vec training dataset contains roughly 7,000,000-word pairs.

It is noted that using a large dataset with raw OCR results for unsupervised learning is useful from a number of perspectives. Where appropriate, more data allows for training a richer model while keeping overfitting at bay. Further, obtaining a human-tagged dataset of character-level annotation is prohibitively expensive. Additionally, using raw OCR results allow the presented model to be robust to mistakes commonly occurring in the dedicated OCR. OCR results containing mis-readings are treated as regular words in the presented model, and their semantic meaning is also learned. Any new words encountered by the model may similarly be embedded based on their n-gram content. Additionally, a standard auto-encoder network with 2 hidden layers of sizes 64 and 32, may be trained. The training of this auto-encoder enables reproducing the 256-embedding vectors, and later use the encoding step (down to 32-dimensions) to provide dimensionality reduction for the embeddings where smaller representations may be desired.

As appropriate, where needed to evaluate the Char2Vec model's robustness to OCR reading errors, the following experiment may be carried out: using the Char2Vec model to find an embedding for each word found in a dictionary of the top 10 k words found in the corpus. A set of 47 invoices were transcribed by hand and then passed through basic data augmentation steps (rotations, blurring, adding salt-and-pepper and shot noise) in order to generate a total of 121 images. Each of these images was pre-processed and binarized, and passed through the Tesseract OCR engine. For each word, longer than 3 characters that was detected by the OCR, embedding it using the same Char2Vec model, and querying the 10 k embedded dictionary words to find the one which is closest in embedding to the OCR-read word. The OCR-read word is then replaced by this 'closest embedding' word.

Then, calculating the overlap between the transcribed words and those found by the dedicated OCR, and the overlap between the transcribed words and those output by the Char2Vec nearest-embedding step. As appropriate, ignoring any words not treated or normalized by the Char2Vec model, that is—any word whose transcribing contained numbers, punctuation, or words shorter than 4 characters.

In total, the dedicated OCR managed to correctly read 80.35% of the words that met the filtering criteria. Following the Char2Vec correction step, the overlap with the transcribed words, was found to be increased to 91.78%. For example, corrected words appeared such as: (a) autegril? autogrill, (b) hancheste manchester and (c) congoyrge concourse and more. These results indicate that the Char2Vec embedding may indeed provide some measure of robustness to OCR errors, as the embeddings of misread words are shown to be close to those of their correct spelling versions.

Additionally, a standard auto-encoder network, may be implemented for use to provide dimensionality reduction for the embeddings where smaller representations are desired. This auto-encoder network has two fully connected hidden layers of sizes 64 and 32. Training this auto-encoder to reproduce the 256-embedding vectors, and later using the encoding step (down to 32-dimensions) to create more compact embeddings. This step shows no negative impact on the quality of the tagging results further down the pipeline, while significantly reducing the memory footprint and run-times of the network.

In order to utilize the semantic information contained in the embedding model for further training, an embedding image is created. For each word read by the OCR, a 256-dimensional embedding vector was found, using the encoder to reduce it to 32 dimensions, and then coloring every pixel within that word's bounding rectangle by the values of the embedding. The embedding image is thus given by:

$$I(x,y,0 \ldots 32) = \text{Encoder}(\text{Char2Vec}(\text{word}_j)),$$

for all $(x, y) \in \text{Rect}(\text{word}_j)$ and $I=0$ otherwise.

Field Extraction with SRE

Having created a model to encode semantic and geometric relations between invoice words, then one may turn to the task of using this information to extract specific invoice 'fields'. These fields may include entries such as DATE_TIME, VAT_AMOUNT, VENDOR_NAME, PAYMENT_METHOD, and the like, each in a different position of the invoice image. The TOTAL_AMOUNT field, may be addressed first as it is one of the most basic needs in understanding the content of the invoice, as well as one of the most difficult fields to correctly identify. One observation to make is that some fields are more likely to appear in certain sections of the image. The TOTAL_AMOUNT field may appear more towards the bottom-right area in left-to-right languages invoices. This in turn indicates that convolutional methods are suitable for finding fields in the image, in particular in the prolific pyramidal encoder-decoder architecture. Further, convolutional methods are better at detecting something regardless of its position in an image. Thus, one may utilize an encoder-decoder patterned convolutional network (U-Net).

Reference is now made to FIG. 10, there is provided a general schematic block diagram representing one possible system architecture, which is generally indicated at 1000, of an encoder-decoder patterned convolutional network (U-Net) according to one embodiment of the current disclosure. The illustrated U-Net network architecture 1000, includes an encoding unit 1006; a Char2Vec component 1008 configured to perform skip-geometric prediction comprising the Char2Vec module 1010; a U-Net component 1012 comprising an encoder 1014 and a decoder 1016; and a C2V auto encoder component 1018 comprising an encoding unit 1020 and a decoding unit 1022.

The system architecture 1000 consists of a set of repeated convolutional and max pooling steps, followed by a set of upscaling steps with transpose convolutions that share weights with their convolution counterparts. The U-Net's output (a set of 35 features per pixel) from the U-Net component 1012 is passed through a 1×1 fully convolutional layer that outputs a set of $n_{out}$ predictions per pixel, where $n_{out}$ is the number of output classes (the possible field labels). Accordingly, the background is treated as its own individual class. These predictions are passed through a softmax layer and provide the per-class segmentation probabilities for each pixel.

Each channel of the network's output is thus a heat-map of a different output class likelihood per pixel, where high values represent higher confidence for that area of the image to contain the associated field. The U-Net network architecture 1000 may be trained using a softmax cross-entropy loss over the per-pixel field-class prediction. The network architecture 1000 also allows the network to learn relational information between the different output classes (such as left-of relations) to improve the tagging accuracy for all of them. The U-Net network architecture 1000 is further trained using a softmax cross-entropy loss over the per-pixel field-class prediction, where contribution of each pixel to the loss function is further weighted by its correct class. These weights may be fine-tuned using a grid search, and help account for the scarcity of positive label pixels in the image.

The input image fed into the U-Net network architecture 1000 may be a 35-layer 'RGB-Embedding' image, created as follows: The processing pipeline starts with an RGB image 1002a that goes through a standard processing step that includes dewarping, binarization and OCR'ing. Then feeding the OCR results through our SRE embedding component 1008 and create a 32-channel embedding image 1004, then going through the encoding unit 1006. This embedding image 1004 is appended to the original RGB image 1002a (resulting in a 35-channel image). The background of the embedding image 1002a is taken to be black (0.0). This choice is due to invoice images having mostly empty background, which may cause "reverse activation" problems unless the empty embedding (the embedding-value for pixels that have no embedding) is zeroed.

For illustrating the problem of "reverse activation", one may think of a completely white RGB image with text in red, and a task of finding text in the image with a strong red component. The red channel in the image is not descriptive, since it is all 1's throughout the image. A learner will have to learn to find the red by looking at the blue and green channels, and finding when they are 0's. In essence, the learner is tasked with finding the reverse activation of red, rather than directly an activation for red. The problem may be eliminated if the background of the image was all 0's (black). The same applies in the augmented image, where finding a strong activation in a layer of the embedding space for each pixel may be reversed, if the empty embedding is 1's and not 0's.

Reversed Field-Tagging Decision:

Given the predictions heatmap images, one must still select the words that represent each field. Invoice images may often contain multiple instances of each field such as TOTALAMOUNT (see example in FIG. 8A). Thus, one may choose to contend with finding for each field (TOTALAMOUNT, VATAMOUNT, and the like) the single best candidate from all OCR results. The way one choses to approach this, is to learn to provide a score for each field (such as the TOTALAMOUNT), for each detected word in the OCR'ed invoice image. One then may pick the word that received the highest score for each field. One's insight is that this can be formulated as a 'reversed' softmax problem: instead of looking at each OCR output and giving it a field designation (that is, the most likely field for the OCR word "T0t41" is the TOTALTAG field) one may pick a field and label it with OCR candidates (that is, the most likely word for the TOTALTAG field is "T0t41").

For each OCR'ed word j one may compose a descriptor vector $x_j$, which consists of some hand-crafted features such as: "is numeric?", "number of decimal dots", "lengths in characters", "y coordinate in the image" and the like, along with features derived from the field-tagger heat maps, such as the total, mean and standard deviation of field confidences within each word's bounding rectangle. One may define the tag score of such a word as:

$$S_j(x_j) = \sum_{i=1}^{m} \theta_i x_j^i,$$

where the $\theta_i$ are parameters to be determined by the learning process, and are fixed for all words j. We are interested in finding the parameters $\theta$ such that the score given to the word representing the invoice TOTALAMOUNT is greater than the score given to all other words. Then mapping the problem to a softmax regression problem by converting these scores to probabilities of a word being the TOTALAMOUNT, using:

$$p(word_j = TOTAL\_AMOUNT | x^{(l)}) = \frac{e^{S_j(x_j^{(l)})}}{\sum_{k=1}^{n} e^{S_k(x_k^{(l)})}} = \frac{e^{\sum_{i=1}^{m} \theta_i x_j^{i(l)}}}{\sum_{k=1}^{n} e^{\sum_{i=1}^{m} \theta_i x_k^{i(l)}}}$$

where (l) denotes the set of features belonging to example l (e.g. the l-th invoice).

Hypothesis. Given the above, the hypothesis for the probability that a word in example l is the total amount will be given by:

$$h_\theta(x^{(l)}) = \begin{bmatrix} p(word_1 = TOTAL\_AMOUNT | x^{(l)}) \\ p(word_2 = TOTAL\_AMOUNT | x^{(l)}) \\ \vdots \\ \vdots \\ p(word_n = TOTAL\_AMOUNT | x^{(l)}) \end{bmatrix} =$$

$$\frac{1}{\sum_{k=1}^{n} e^{S_k(x_k^{(l)})}} \begin{bmatrix} e^{S_0(x_0^{(l)})} \\ e^{S_1(x_1^{(l)})} \\ \vdots \\ \vdots \\ e^{S_n(x_n^{(l)})} \end{bmatrix},$$

and our choice for the total amount will be the word for which the probability is maximal.

Cost Function. Similarly to softmax regression, one may define our cost function (with q training examples, where each training example l has $n_l$ words):

$$J(\theta) = -\frac{1}{q} \sum_{l=1}^{q} \sum_{j=1}^{m} \mathbb{I}(word_j^{(l)} = TOTAL_{AMOUNT}^{(l)}) \times \log\left(\frac{e^{S_j(x_j^{(l)})}}{\sum_{k=1}^{n} e^{S_k(x_k^{(l)})}}\right) + \frac{\lambda}{2} \sum_{i=1}^{m} \theta_i^2$$

where $\mathbb{I}(x)$ (an indicator function) is 1 if x=true and 0 otherwise. Note the addition of a regularization term over $\theta$.

To apply an optimization algorithm, one needs the gradient of the cost function with respect to the $\{\theta\}$, which is given by:

$$\frac{\partial J(\theta)}{\partial \theta_i} = -\frac{1}{q} \sum_{l=1}^{q} \left[ x_j^{i,(l)} - \frac{\sum_{r=1}^{n_l} x_r^{i,(l)} e^{S_r(x_r^{(l)})}}{\sum_{k=1}^{n_l} e^{S_k(x_k^{(l)})}} \right] + \lambda \theta_i,$$

where j is the index for which $word^{(l)}$=TOTAL_AMOUNT$^{(l)}$).

Note that contrary to the standard softmax, the $\{\theta\}$ are shared between our 'output classes' (the candidate words). One may optimize for $\theta$ with a standard gradient descent algorithm over all of the samples in the dataset. The result of the inference process using this field is the final requested information: which amount in the OCR'ed receipt is the TOTALAMOUNT, which is the VATAMOUNT, and the like.

Figure 11A:
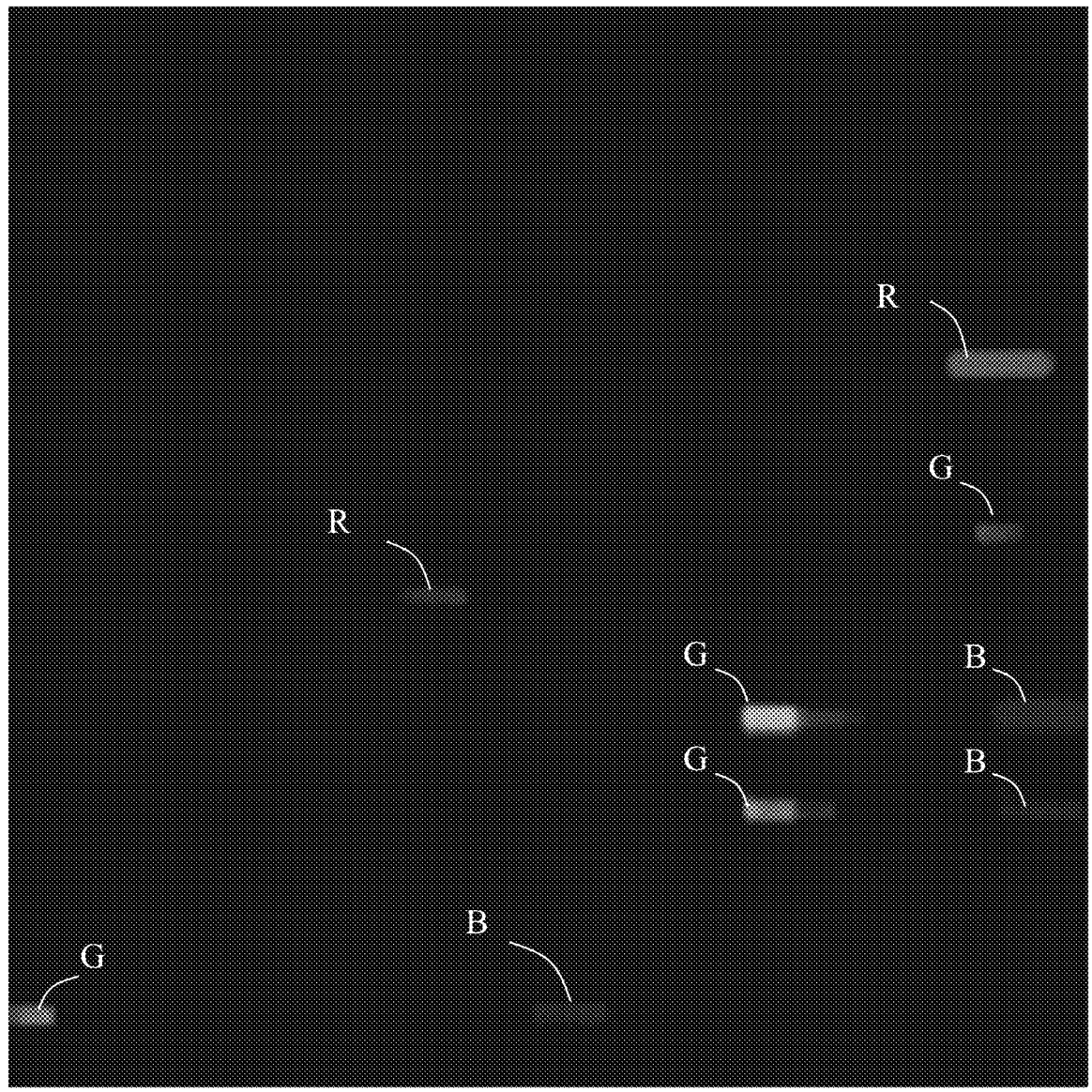
Figure 11B:
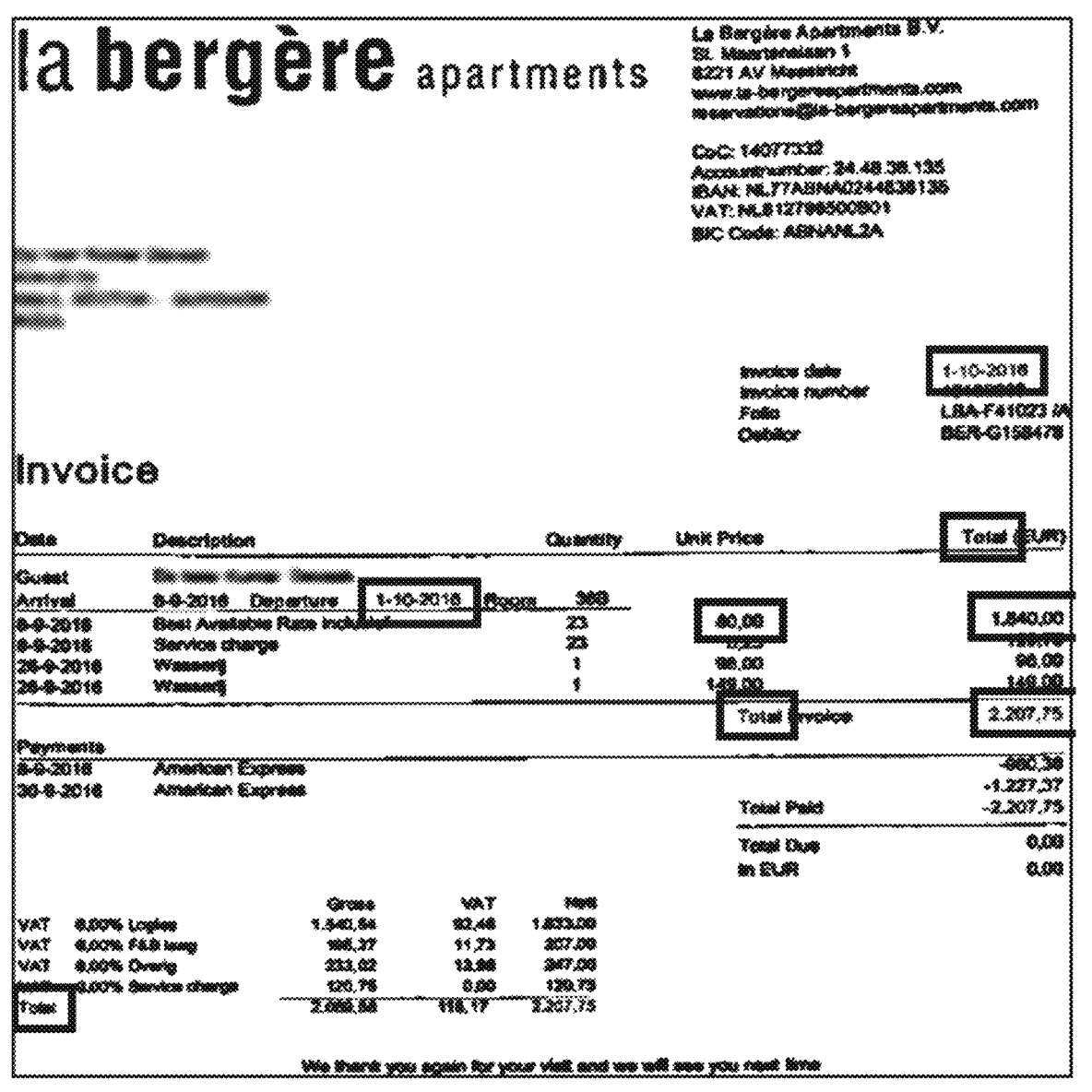

Reference is now made to FIGS. 11A and 11B, there is provided general images representing the results for the automatic field tagging process, which is generally indicated at 1100A and 1100B, according to embodiments of the current disclosure.

As shown in FIG. 11A, the captured image represents the total label confidence per pixel. Red R indicates a date, blue B a total amount and green G a total label. FIG. 11B represents the same field confidences, overlayed on the invoice image itself. Note not all occurrences of the word 'Total' peak the detector, rather only ones linked to a total amount.

Experimental Results and Evaluation:

By way of illustration a number of experiments are presented which were carried out in order to study the effects of our embedding step on prediction quality and the assumption that the network can leverage geometric relationships between different field types to improve their tagging accuracy.

Figure 12:
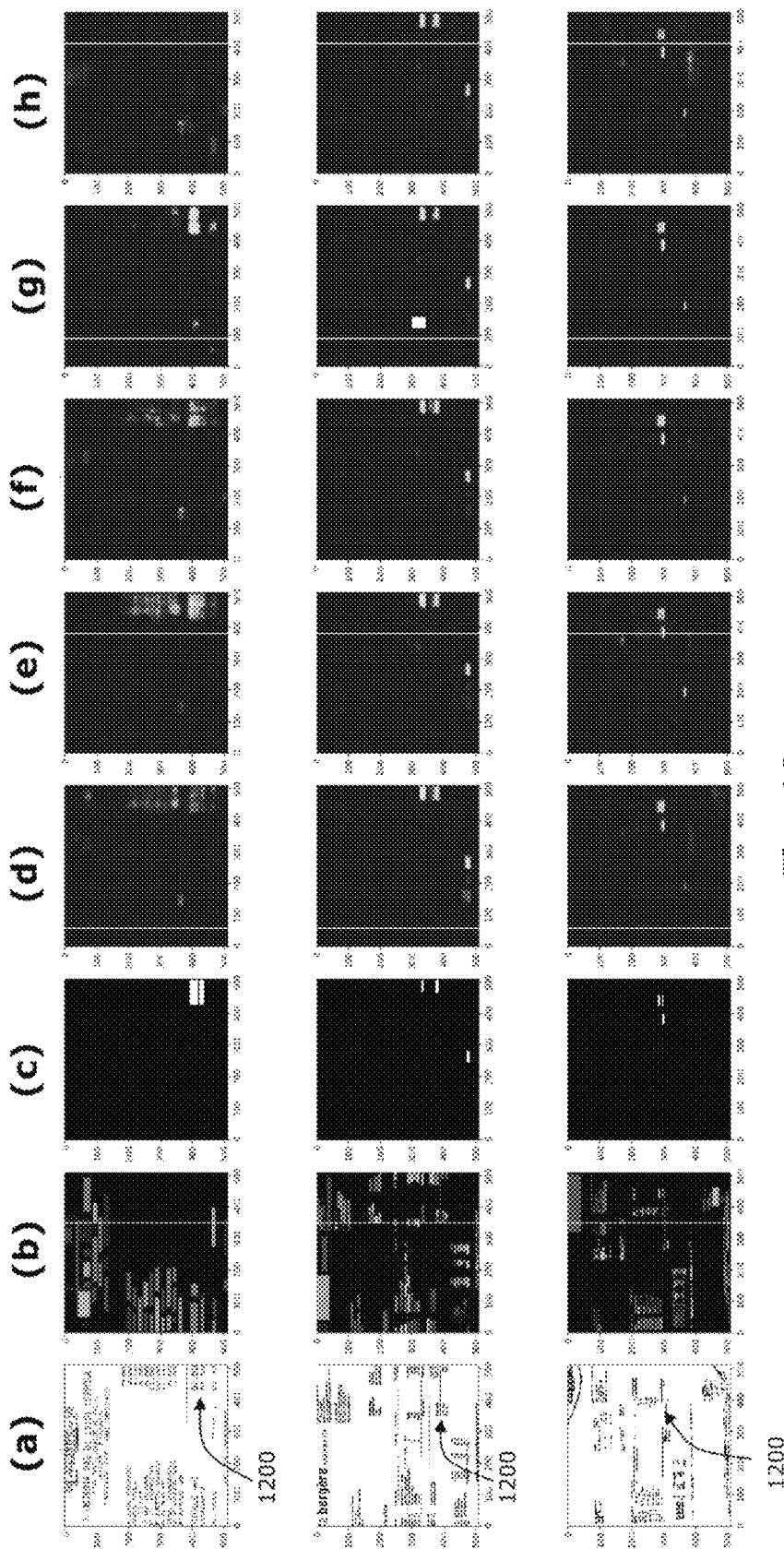
FIG. 12 is an image representing the heat-maps generated by different experimental models for the TOTALAMOUNT field.

Reference is now made to FIG. 12, there is provided a general image representing the heat-maps generated by the different experimental models for the TOTALAMOUNT field, the position of which is generally indicated at 1200 in each of three invoices, according to embodiments of the current disclosure. In table 1, the accuracy metrics for total amount detection at the end of our pipeline, is shown, as well as the validation dice scores for the U-Net part of the model. The provided accuracy metrics are the percentage of invoices where the tagging framework managed to identify one of the correct instances of the TOTALAMOUNT, taking into consideration only those invoices for which the dedicated OCR engine managed to correctly read the amount in at least one location.

The accuracy metrics can be seen to improve with addition of more fields (total label, date) to the deep network step. We expect this trend to continue as even more fields are added and the network is able to exploit both the additional spatial relationships and the increase in bits of tagged data.

A surprising result was that the network performs better when supplied with only the base invoice image, rather than with an embedding image that includes semantic OCR information. We speculate that this is in large due to instances where the dedicated OCR was unable to read the total text in the regions labeled as a total amount. In such an instance, the embedding layers contain no information, while the base image still contains information that can be leveraged. Having to provide a positive label where there is a distinct lack of signal is a likely cause of confusion for the network. As a result, we investigated a joint model, where we use a combination of features extracted from the two network types—both one which includes the embedding image and one which includes the original invoice image alone. We found that this combined model provides the best downstream results. This shows that the embedding layers contain information that can help improve accuracy, and that the two network configurations each hold an advantage for a different class of invoice. A more refined analysis of the instances where they outperform each-other is left for future work.

Downstream total-amount-tagging accuracy (Amt. Acc.) results and U-Net validation set dice scores (where applicable) for each experiment performed. A=Amount, T.L.=Total Label, D=Date. The experiments are as follows: (a)—a naive tagger which always picks the largest number with exactly 2 decimal digits. (b)—same as (a), but also attempts to rescue amounts by 'fixing' common OCR mistakes, such as 9↔g or 0↔o. (c)—The 'inverse softmax' step alone, without any U-Net related features. (d)—U-Net features, trained only to provide a 'total amount' heatmap, and using the full embedding image (3 RGB layers+32 embedding layers). (e)—Same as (d) but trained to provide a 'total label' heatmap as well. (f)—Same as (e), but trained to provide a 'date' heatmap as well. (g)—Same as (f), but using only the 3 RGB channels of the image as input. (h)—Same as (f), but using only the 32 embedding layers of the image as input. (i)—Combined model feeding features from both (f) and (g) into the 'inverse softmax'

TABLE 1

| Experiment | Amt. Acc. | Dice Score |
|---|---|---|
| (a) Naïve | 45.72% | — |
| (b) Naïve + Basic Rescue | 73.67% | — |
| (c) Softmax Only | 81.86% | — |
| (d) Softmax + U-Net, A Only, Full Embedding | 84.66% | 0.5825 |
| (e) Softmax + U-Net, A + T.L., Full Embedding | 85.72% | 0.5299 |
| (f) Softmax + U-Net, A + T.L. + D, Full Embedding | 86.36% | 0.5966 |
| (g) Softmax + U-Net, A + T.L. + D, Only Image | 87.21% | 0.6367 |
| (h) Softmax + U-Net, A + T.L. + D, Only Embedding | 84.28% | 0.5910 |
| (i) Two Part Model: Joint (f) + (g) | 87.86% | — |

FIG. 12 represents the tagging results for a set of invoices using different models. For each of the three invoices shown: (a) a thumbnail image of the preprocessed invoice image (the text of which is not important for the purposes of the illustration, and is thus shown as illegible text) with the position generally indicated of the TOTAL AMOUNT field 1200, (b) the first three embedding image channels, (c) the human labeler tags for total amounts, (d)-(h) total amount heatmaps for the different models, using the same identities as in the table above.

Word format and geometric position are imperative signals for tabular document image analysis, and invoice images in particular. These features convey relationship, context and content, which are useful for information extraction as well as correction.

Accordingly, character-level embedding has been surprisingly found to support high-level information extraction from receipt and invoice images. A joint model is introduced, based on convolutional neural networks for both image and text analysis, operable to locate particular pieces of information in the image based on their semantic information. Then, experimentally one may show that the resulting language embeddings are meaningful and the detector is able to find the information with high accuracy on various difficult examples.

Furthermore, a language model may be based on character-level embedding joined with visual representation, which sums up to a bottom-up approach of analyzing a document image, from low-level features to high-level understanding. A different approach suggests marrying this bottom-up outlook with a top-down one, such as document layout analysis or document type classification, which may bring about an overall improvement.

It is particularly noted that this visual-linguistic space of document analysis shows high recognition rates close to human-level recognition rates.

Technical Notes

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. A method for use in an expense management platform operable to perform content analysis of an imaged invoice document comprising at least one invoice, in an improved manner, said expense management platform comprising:
an automatic invoice analyzer (AIA) comprising a dedicated invoice optical character recognition (OCR) engine, said automatic invoice analyzer (AIA) operable to perform automated analysis of the at least one invoice;
a machine learning engine comprising a knowledge repository; and
a neuronal visual-linguistic mechanism trained to perform visual-linguistic semantic analysis, wherein said neuronal visual-linguistic mechanism comprises a geometrically trained neuronal network, said method comprising the steps of:
receiving, via a communication interface, the imaged invoice document;
pre-processing, by said automatic invoice analyzer (AIA), said at least one invoice;
extracting, by said dedicated invoice optical character recognition (OCR) engine, a set of OCR results associated with said at least one invoice;
generating, by said automatic invoice analyzer (AIA), an OCR-enhanced image of the at least one invoice;
applying, by said automatic invoice analyzer (AIA), linguistic semantic analysis geometrically to determine a semantic information of at least one element of the at least one invoice; and
producing, by said automatic invoice analyzer (AIA), one or more analysis results using said neuronal visual-linguistic mechanism;
wherein the step of applying further comprises:
creating an embedding model operable to generate an encoding vector to find an embedding that encodes a pair relationship of a word and a target neighbor;
training a network using the encoding vector; and
creating a working dataset based an initial dataset and further performing augmentation using synthetic image transformations and simulated noise to receive said working dataset.

2. An expense management platform operable to perform automatic data retrieval from an imaged invoice document, said expense management platform comprising:
an automatic invoice analyzer (AIA) operable to perform automated analysis of the imaged invoice document;
a machine learning engine comprising a knowledge repository, said machine learning engine operable to update the knowledge repository with data pertaining to said invoice imaged document; and
a neuronal visual-linguistic mechanism trained to perform visual-linguistic semantic analysis;
wherein said neuronal visual-linguistic mechanism comprises a geometrically trained neuronal network, such that said expense management platform is operable to produce one or more analysis results using said neuronal visual-linguistic mechanism to determine geometric-semantic information;
wherein said visual-linguistic mechanism comprises a full tagging sub-system operable to provide word matching; and
wherein said full tagging sub-system, comprises:
a Char2Vec network operable to generate at least one word-level embedding from an associated character level content and an associated geometric context;
a labeling network operable to generate a heat-map of at least one label probability using a base image overlaid with data of the at least one word-level embedding; and
an inverted-softmax linear classifier configured to determine a best candidate word to match the at least one label probability using said heat-map and a set of hand-crafted features.

* * * * *